(12) United States Patent
Garsha et al.

(10) Patent No.: US 12,320,752 B2
(45) Date of Patent: *Jun. 3, 2025

(54) SYSTEM LEVEL CALIBRATION

(71) Applicant: Ventana Medical Systems, Inc., Tucson, AZ (US)

(72) Inventors: Karl Garsha, Sahuarita, AZ (US); Dustin Harshman, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/365,805

(22) Filed: Aug. 4, 2023

(65) Prior Publication Data
US 2023/0375477 A1    Nov. 23, 2023

Related U.S. Application Data

(63) Continuation of application No. 16/680,319, filed on Nov. 11, 2019, now Pat. No. 11,747,280, which is a
(Continued)

(51) Int. Cl.
*G01N 21/64* (2006.01)
*G01N 21/27* (2006.01)
(Continued)

(52) U.S. Cl.
CPC ....... *G01N 21/6458* (2013.01); *G01N 21/274* (2013.01); *G01N 21/6428* (2013.01);
(Continued)

(58) Field of Classification Search
USPC .......................................... 382/128; 436/172
See application file for complete search history.

(56) References Cited

U.S. PATENT DOCUMENTS 5,485,527 A    1/1996   Bacus et al.
6,686,583 B2 *  2/2004   Engelhardt ............. G02F 1/113
                                                        250/227.18
(Continued)

FOREIGN PATENT DOCUMENTS

CN    101368908 A    2/2009
CN    102165489 A    8/2011
(Continued)

OTHER PUBLICATIONS

International Search Report and Written Opinion, mailed Sep. 10, 2018, in corresponding PCT/EP2018/067095 filed Jun. 26, 2018, pp. 1-349.

*Primary Examiner* — Ishrat I Sherali
(74) *Attorney, Agent, or Firm* — Charney IP Law LLC; Thomas M. Finetti

(57) ABSTRACT

Disclosed herein are systems and methods of calibrating a microscope or an imaging system prior to acquiring image data of a sample. In some embodiments, a method is disclosed including the steps of (a) running a power output calibration module to calibrate an imaging apparatus for repeatability; (b) running an image intensity calibration module to calibrate the imaging apparatus for reproducibility and to mitigate differences in detection efficiency between channels; (c) collecting image data from a microscope or imaging system; (d) optionally running an unmixing module to unmix the collected image data into individual image channel images; and (e) optionally running a contrast agent intensity correction module to calibrate for differences in brightness between different contrast agents.

20 Claims, 15 Drawing Sheets

Related U.S. Application Data continuation of application No. PCT/EP2018/067095, filed on Jun. 26, 2018.

(60) Provisional application No. 62/525,818, filed on Jun. 28, 2017.

(51) Int. Cl.
  *G02B 21/36* (2006.01)
  *G06T 5/92* (2024.01)
  *H04N 23/73* (2023.01)

(52) U.S. Cl.
  CPC .............. *G02B 21/365* (2013.01); *G06T 5/92* (2024.01); *H04N 23/73* (2023.01); *G01N 2021/6439* (2013.01); *G06T 2207/10056* (2013.01); *G06T 2207/10064* (2013.01); *G06T 2207/10144* (2013.01)

(56) References Cited

U.S. PATENT DOCUMENTS

| | | | |
|---|---|---|---|
| 8,712,118 B2* | 4/2014 | De La Torre-Bueno | G01N 21/6458 382/128 |
| 9,080,978 B2* | 7/2015 | Christiansen | G01N 21/276 |
| 9,275,441 B2* | 3/2016 | Marcelpoil | G06V 20/693 |
| 9,797,767 B2* | 10/2017 | Corwin | G01N 21/274 |
| 10,012,537 B2* | 7/2018 | Garsha | G01J 3/28 |
| 10,078,778 B2* | 9/2018 | Adalsteinsson | G02B 21/16 |
| 10,890,838 B2* | 1/2021 | Grunwald | G02B 21/0076 |
| 11,566,941 B2 | 1/2023 | Garsha et al. | |
| 11,747,280 B2* | 9/2023 | Garsha | G01N 21/274 436/172 |
| 2009/0065709 A1 | 3/2009 | Fischer et al. | |
| 2010/0033518 A1 | 2/2010 | Shekarchi et al. | |
| 2015/0369664 A1* | 12/2015 | Garsha | G01J 3/44 356/402 |
| 2016/0061654 A1 | 3/2016 | Corwin et al. | |
| 2016/0209319 A1* | 7/2016 | Adalsteinsson | G01B 21/08 |
| 2019/0204577 A1 | 7/2019 | Faris et al. | |

FOREIGN PATENT DOCUMENTS

| | | |
|---|---|---|
| JP | 5007462 B2 | 8/2012 |
| WO | 2010033508 A1 | 3/2010 |
| WO | 2014118326 A2 | 8/2014 |
| WO | 2016030401 A1 | 3/2016 |
| WO | 2016115537 A2 | 7/2016 |

* cited by examiner

SYSTEM LEVEL CALIBRATION

CROSS REFERENCE TO RELATED APPLICATIONS

The present application is a continuation of U.S. patent application Ser. No. 16/680,319 filed on Nov. 11, 2019, which application is a continuation of International Application No. PCT/EP2018/067095 filed on Jun. 26, 2018, which application claims the benefit of the filing date of U.S. Provisional Patent Application No. 62/525,818, filed on Jun. 28, 2017, the disclosure of which is hereby incorporated by reference herein in its entirety.

BACKGROUND OF THE DISCLOSURE

Fluorescence is used as a tool in biological research to provide contrast formation in imaging applications. Quantification of fluorescent signals has become an important tool to analyze cellular structure and function. One reason for the success of fluorescent imaging in cell biology, besides the excellent availability of labels including fluorescent proteins, is the cost-efficient use of equipment. A standard fluorescent microscope is equipped with a number of filter sets, typically consisting of exciter, emitter, and dichroic filters, and a lamp for excitation. However, the power output of a light source changes over time and the total energy delivered to the specimen may depend on the optical path of the microscope and the filter sets and objectives used, as well as on their alignment. Changes in the environment, photo damage to the filter sets, and run time of the light source may lead to a deterioration of the transmission characteristics of the microscope, adding variability to results and making comparison of experiments difficult.

BRIEF SUMMARY OF THE DISCLOSURE

As multiplexed tissue assays (e.g. those using fluorophores) become increasingly complex, sources of variability continue to accumulate. At the same time, computer-based scoring methods require tighter assay tolerances as compared to human-based scoring, yet fluorescent assays are particularly sensitive to deviations in illumination. In fluorescent microscopy, for example, the signal is generated from a stain's interaction with the light exposed during the imaging process, therefore, the signal is inherently tied to how the image is acquired. In order to measure staining on the slide, any variation and bias within imaging instrumentation must be accounted for so as not to confuse deviations in the imaging equipment with a property of the staining. Some calibration options, e.g. those using a long-pass filter cube, allow for greater than 20% variability between imaging instrument systems and between calibration periods. Without wishing to be bound by any particular theory, it is believed that this large variability inhibits the ability to conduct image analysis downstream.

Applicant has developed a superior digital pathology system incorporating a calibration procedure that reduces variability as compared with known methods, allowing for greater accuracy and reproducibility in the measurement of the stains present in a sample. Applicant submits that the disclosed method is superior in that variability from all system components is accounted for in the calibration.

Moreover, Applicant submits that the calibration method disclosed herein considers the entire light path during calibration, and all the components are left "in place" as they will be configured during image acquisition. This is believed to enable the entire system to be calibrated such that results from different systems (e.g. instruments) are reproducible and acquired data can be meaningfully compared. This also allows for a longer time period between re-calibration (e.g. at least about 50 hours of lamp use); and it is believed that the procedures outlined herein enable a lamp intensity to be maintained within about +/−2.5% of a camera counts setpoint in-between calibrations. Applicant believes that this enables an order of magnitude improvement over known calibration procedures using only a long-pass filter.

Applicant further submits that systems employing the calibration procedures (and obtained calibration data) facilitate standardized image acquisition. For example, the systems disclosed herein are configured to automatically set power outputs and exposure times upon instrument initialization based on derived calibration data. Applicant believes that this further minimizes the chances of user error in setting the calibrated power and forgetting to use a calibrated light level during an experiment. These and other advantages are described herein.

One aspect of the present disclosure is a method of imaging a biological sample (e.g. a tissue sample) having one or more stains, each stain identifying a particular target within the biological sample, the method including: setting a first power output of a light source for a first channel such that a first predetermined power value is reached; adjusting a first exposure time of an imaging sensor to yield a first target intensity at the first predetermined power value for the first channel; acquiring a first image of the biological sample in a first channel based on the adjusted first exposure time; and optionally adjusting pixel data in the first acquired image based on a first derived image correction factor specific to one of the one or more stains within the first channel. In some embodiments, the method further comprises quantifying an amount of the one or more stains within the tissue sample based on the adjusted pixel data in each acquired image.

In some embodiments, a first power output or power output level (used interchangeably herein) for the light source is derived from preexisting calibration data for the first channel (e.g. calibration data stored in a non-transitory computer readable medium or a database). In some embodiments, the preexisting calibration data is a table of "look-up" values as described herein. In some embodiments, the preexisting calibration data is a calibration curve correlating power output levels with measured power, i.e. a calibration curve of power output versus measured power. In some embodiments, the first predetermined power value is specific to a particular assay. In some embodiments, the first predetermined power value is the same for all channels (e.g. a PDL1 assay may call for a power value of 100 mW to be used across all channels to be imaged).

In some embodiments, the first target intensity is a predetermined percentage of a standardized target intensity of a calibration sample for the first channel. In some embodiments, the predetermined percentage ranges from about 10% to about 1000% of the standardized target intensity for the first channel. In some embodiments, the predetermined percentage ranges from about 20% to about 500% of the standardized target intensity for the first channel. In some embodiments, the predetermined percentage ranges from about 50% to about 250% of the standardized target intensity for the first channel.

In some embodiments, the standardized target intensity for the first channel is derived by (i) determining calibration intensity values of the calibration standard (used interchangeably with the term "calibration sample" herein) for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

In some embodiments, the first derived image correction factor is computed by (i) normalizing brightness values for a plurality of stains; and (ii) subtracting the normalized brightness value for the first stain from the integer 1. In some embodiments, the pixel data within the first image is adjusted by multiplying each pixel value within the first image by the first image correction factor. In some embodiments, the method further comprises unmixing the first acquired image prior to adjusting the pixel data. In some embodiments, each of the steps identified above (or described herein) may be repeated for each additional channel to be imaged, including $2^{nd}$, $3^{rd}$, and nth channels.

In another aspect of the present disclosure, a method of imaging a biological sample stained with one or more stains is provided, wherein each stain identifies a particular biomarker within the biological sample, the method including: setting a power output of a light source for each of a plurality of image channels such that a predetermined power value is reached, wherein the predetermined power value is substantially the same for each of a plurality of image channels, and wherein the power output is independently set for each channel to be imaged; adjusting an exposure time of a camera to yield a target intensity at the predetermined power value, wherein the exposure time of each of a plurality of image channels is independently adjusted to yield the target intensity for that particular image channel; acquiring a series of images of the biological sample at each of a plurality of image channels based on the adjusted exposure times; and optionally adjusting pixel data in each image of the series of acquired images based on derived image correction factors specific to each of the one or more stains. In some embodiments, the method further comprises quantifying an amount of the one or more stains within the tissue sample based on the adjusted pixel data in each acquired image. In some embodiments, the power output level for the light source is derived from preexisting calibration data for each of a plurality of image channels. In some embodiments, the preexisting calibration data is a calibration curve of power output versus measured power. In some embodiments, the predetermined power value is specific to a particular assay. In some embodiments, the predetermined power value is the same for each of a plurality of image channels.

In some embodiments, the target intensity for a particular channel is a predetermined percentage of a standardized target intensity of a calibration sample for that channel. In some embodiments, the predetermined percentage ranges from about 20% to about 500% of the standardized target intensity for that channel. In some embodiments, the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

In some embodiments, the derived image correction factors are computed by (i) normalizing brightness values for a plurality of stains; and (ii) subtracting the normalized brightness value for each stain from the integer 1. In some embodiments, the pixel data within each acquired image is adjusted by multiplying each pixel value within each acquired image by the respective image correction factor. In some embodiments, the method further comprises unmixing the acquired image prior to adjusting pixel data.

Another aspect of the present disclosure is a method of imaging a biological sample stained with one or more contrast agents, wherein the contrast agents label targets within the biological sample, the method including the steps of: adjusting a power output of a light source for each channel to be imaged using power output calibration data for each channel such that a power value for each channel is substantially the same; adjusting exposure times for each channel using image intensity calibration data such that image intensities across each channel to be imaged are substantially the same; acquiring images of the biological sample at each channel based on the adjusted exposure times to provide a series of acquired channel images; unmixing each of the acquired images to provide a series of unmixed images; and adjusting pixel data in each unmixed image based on derived image correction factors specific to each of the one or more stains. In some embodiments, the method further comprises quantifying an amount of the one or more stains within the biological sample based on the adjusted pixel data in each unmixed image. In some embodiments, the power output calibration data, the image intensity calibration data, and image correction factors are stored in a non-transitory computer readable medium. In some embodiments, the power output calibration data, the image intensity calibration data, and image correction factors are determined in real-time.

In some embodiments, the power output calibration data is a table of look-up values of power output for a light source versus power values measured at the sample plane. In some embodiments, the image intensity calibration data is selected from the group consisting of (i) ratios of target intensities for each channel of a plurality of image channels, and (ii) ratios of exposure times for each channel of a plurality of image channels relative to a longest exposure time to be imaged. In some embodiments, the derived image correction factors are computed by (i) normalizing brightness values for a plurality of stains; and (ii) subtracting the normalized brightness value for each stain from the integer 1. In some embodiments, the method further comprises unmixing the acquired image prior to adjusting pixel data.

In another aspect of the present disclosure is a method of imaging a biological sample stained with one or more stains, each stain selectively staining a particular biomarker within the biological sample, comprising: deriving a power value for each image channel of a plurality of image channels, wherein each power value for each image channel image is substantially the same, the power values derived by adjusting a power output of a light source for each image channel of the plurality of image channels based power output calibration data for each of the image channels; adjusting exposure times for each image channel of the plurality of image channels using image intensity calibration data such that image intensities across each image channel of the plurality of image channels are substantially the same; acquiring a plurality of images of the biological sample at each image channel based on the adjusted exposure times to provide a series of acquired channel images; unmixing each of the acquired images to provide a series of unmixed image channel images; and adjusting pixel data in each unmixed image channel image based on derived image correction factors specific to each of the one or more stains.

In some embodiments, the power output calibration data is a table of look-up values of power output for a light source versus power values measured at the sample plane. In some embodiments, the image intensity calibration data is selected from the group consisting of (i) ratios of target intensities for each channel of the plurality of image channels, and (ii) ratios of exposure times for each channel of the plurality of image channels relative to a longest exposure time to be imaged. In some embodiments, the derived image correction factors are computed by (i) normalizing brightness values for a plurality of stains; and (ii) subtracting the normalized brightness value for each stain from the integer 1. In some embodiments, the method further comprises quantifying an amount of the one or more stains within the biological sample based on the adjusted pixel data in each unmixed channel image.

In another aspect of the present disclosure, a non-transitory computer-readable medium storing computer executable instructions is provided, which when executed by one or more processors, cause the one or more processors to: set a power output of a light source for each of a plurality of image channels using pre-existing power output calibration data for each channel such that a predetermined power value for each channel is reached, where the predetermined power value is the same for each channel and where the predetermined power value is specific to a particular assay; adjust exposure times for each channel using pre-existing image intensity calibration data such that image intensities across each of a plurality of image channels are substantially the same; acquire images of a biological sample at each image channel based on the adjusted exposure times to provide a series of acquired image channel images, wherein the biological sample is stained with one or more stains, each stain selectively identifying a particular target within the biological sample; and adjusting pixel data in each individual acquired image channel image based on derived image correction factors specific to each of the one or more stains.

In some embodiments, the power output calibration data is a table of power output values correlated with power values measured at the sample plane. In some embodiments, the image intensity calibration data are ratios of target intensities for each channel to be imaged. In some embodiments, the ratios of target intensities for each channel to be image are derived by (i) determining intensity values of the calibration standard for a plurality of image channels; (ii) normalizing the intensity values of the calibration standard for each of the plurality of image channels to a highest intensity value; and (iii) deriving a ratio of normalized intensity across the series of image channels.

In some embodiments, the derived image correction factors are computed by (i) normalizing brightness values for a plurality of stains; and (ii) subtracting the normalized brightness value for each stain from the integer 1. In some embodiments, the non-transitory computer-usable medium further comprises instructions which cause the processor to unmix the series of acquired channel images prior to adjusting pixel data. In some embodiments, the stains are fluorophores. In some embodiments, the stains are chromophores.

Another aspect of the present disclosure is an imaging system including: an illumination source (used interchangeably with the term "light source" herein), one or more lenses, a camera, at least one of a control system or computer having one or more processors, and the non-transitory computer-usable medium described above. In some embodiments, the imaging system further comprises a slide handling mechanism. In some embodiments, the slide handling mechanism is adapted to deliver a slide to a specimen plane. In some embodiments, the slide handling mechanism is adapted to deliver one of a power meter or a calibration sample to a specimen plane, whereby the power meter and/or calibration samples may be used to calibrate or re-calibrate an instrument, or to verify that stored calibration data is accurate or within a specified tolerance. In some embodiments, the imaging system further comprises a non-transitory computer-usable medium storing computer executable instructions which, when executed by the one or more processors, cause the one or processors to generate new or revised power output calibration data or image intensity calibration data.

In another aspect of the present disclosure, a digital pathology system is provided, the digital pathology system including (i) an imaging apparatus, (ii) at least one of a control system or computer, and (iii) a non-transitory computer-usable medium described above. In some embodiments, the imaging apparatus is a multi-spectral imaging apparatus.

In another aspect of the present disclosure is a system comprising one or more processors and a memory coupled to the one or more processors, the memory to store computer-executable instructions that, when executed by the one or more processors, cause the one or more processors to perform operations comprising: setting a first power output of a light source for a first channel such that a predetermined power value is reached; adjusting a first exposure time of a camera to yield a first target intensity at the predetermined power value for the first channel; acquiring a first image of a biological sample at a first channel based on the adjusted exposure time, wherein the biological sample is stained with one or more stains, each stain selectively identifying a particular target within the biological sample; and adjusting pixel data in the first acquired image based on a first derived image correction factor specific to one of the one or more stains within the first channel. In some embodiments, the first power output level for the light source is derived from preexisting calibration data for the first channel. In some embodiments, the preexisting calibration data is a calibration curve of power output versus measured power. In some embodiments, the first predetermined power value is specific to a particular assay. In some embodiments, the first predetermined power value is the same for all channels. In some embodiments, the first target intensity is a predetermined percentage of a standardized target intensity of a calibration sample for the first channel. In some embodiments, the predetermined percentage ranges from about 20% to about 500% of the standardized target intensity for the first channel. In some embodiments, the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels. In some embodiments, the first derived image correction factor is computed by (i) normalizing brightness values for a plurality of stains; and (ii) subtracting the normalized brightness value for the first stain from the integer 1. In some embodiments, the pixel data within the first image is adjusted by multiplying each pixel value within the first image by the first image correction factor. In some embodiments, the system further comprising instructions for unmixing the first acquired image prior to adjusting the pixel data.

BRIEF DESCRIPTION OF THE FIGURES

For a general understanding of the features of the disclosure, reference is made to the drawings. In the drawings, like reference numerals have been used throughout to identify identical elements.

DETAILED DESCRIPTION

Figure 1A:
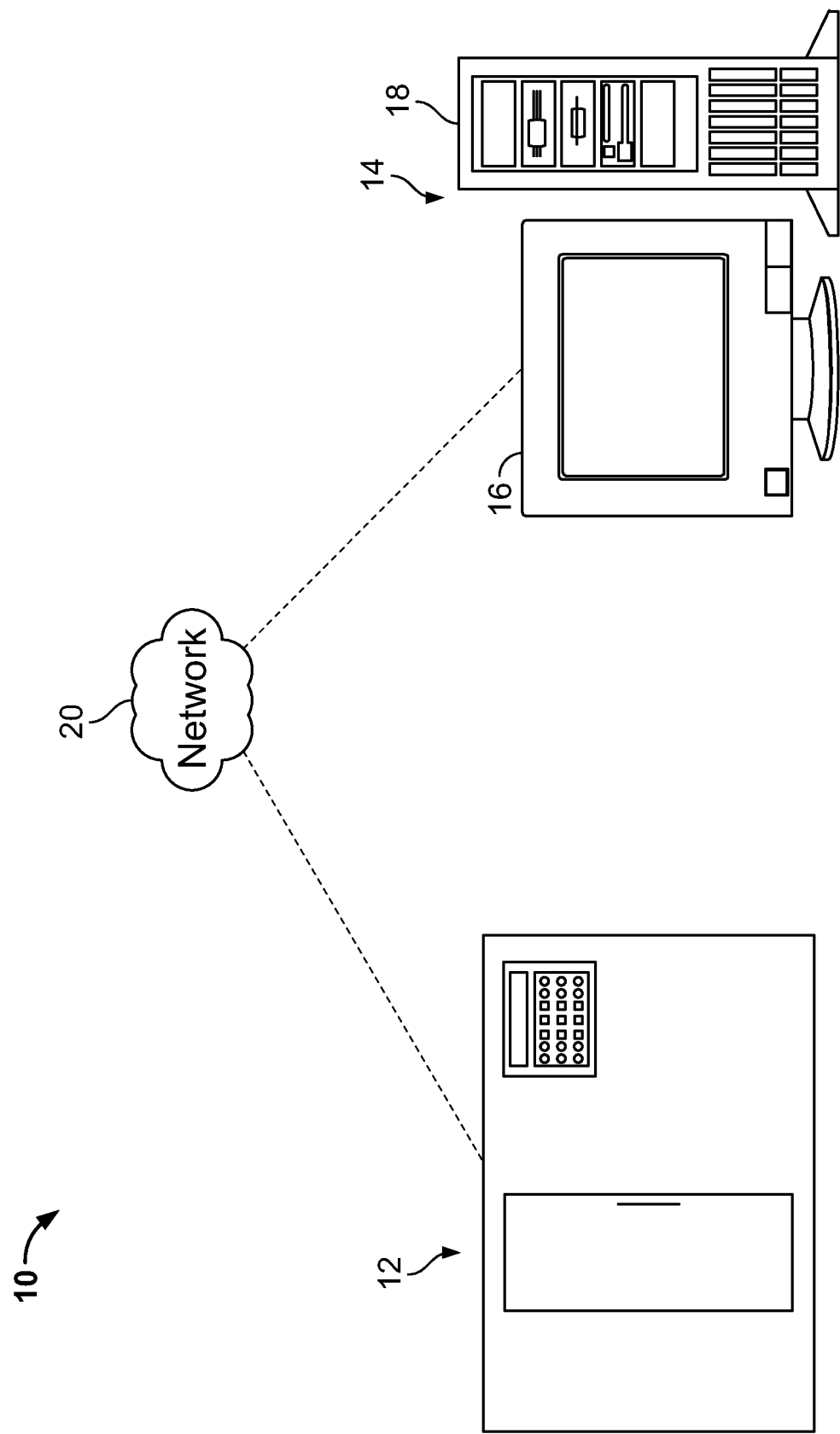
FIG. 1A illustrates a representative digital pathology system including an imaging apparatus and a computer system.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the term "biomarker" refers to a biological molecule found in blood, other body fluids, or tissues that is a sign of a normal or abnormal process, or of a condition or disease (such as cancer). A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR–ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

As used herein, the terms "contrast agent," "label," or "stain" means a reagent that is capable of binding to an analyte, being internalized or otherwise absorbed, and being detected, e.g., through shape, morphology, color, fluorescence, luminescence, phosphorescence, absorbance, magnetic properties, or radioactive emission.

As used herein, the terms "image," "image scan," or "scanned image" encompasses raw image data acquired from the biological tissue sample, such as by means of an optical sensor or sensor array, or pre-processed image data. In particular, the image data may comprise a pixel matrix.

As used herein, the terms "multi-channel image" or "multiplex image" encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

As used herein, the terms "probe" or "oligonucleotide probe" refers to a nucleic acid molecule or nucleic acid analog molecule (for example, a peptide nucleic acid) used to detect a complementary nucleic acid target gene.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the term "specific binding entity" refers to a member of a specific-binding pair. Specific binding pairs are pairs of molecules that are characterized in that they bind each other to the substantial exclusion of binding to other molecules (for example, specific binding pairs can have a binding constant that is at least $10^3$ M−1 greater, $10^4$ M−1 greater or $10^5$ M−1 greater than a binding constant for either of the two members of the binding pair with other molecules in a biological sample). Particular examples of specific binding moieties include specific binding proteins (for example, antibodies, aptamers, lectins, avidins such as streptavidins, and protein A). Specific binding moieties can also include the molecules (or portions thereof) that are specifically bound by such specific binding proteins.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Some staining performed by the system can be used to visualize an outline of a cell. Other staining performed by the system may rely on certain cell components (such as molecules or structures) being stained without or with relatively little staining other cell components. Examples of types of staining methods performed by the system include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH) and chromogenic ISH.

As used herein, the term "substantially" means the qualitative condition of exhibiting total or near-total extent or degree of a characteristic or property of interest. One of ordinary skill in the art will understand that biological and chemical phenomena rarely, if ever, go to completion and/or proceed to completeness or achieve an absolute result. In some embodiments, "substantially" means within about 20%. In some embodiments, "substantially" means within about 15%. In some embodiments, "substantially" means within about 10%. In some embodiments, "substantially" means within about 5%.

As used herein, the term "target" means any molecule for which the presence, location and/or concentration is or can be determined. Examples of targets include nucleic acid sequences and proteins, such as those disclosed herein.

Digital Pathology Systems

The present disclosure relates to systems and methods for reducing variability in qualitative and/or quantitative results from a microscope or imaging system, the microscope or imaging system having an illumination source, an optics portion (e.g. one or more objective lenses), and a detection portion (e.g. a camera) cooperatively arranged for obtaining an image of a sample (e.g. a biological sample). As described further herein, Applicant has developed a system level calibration procedure including at least two calibration steps which, when integrated into a digital pathology system, enables the collection of standardized quantitative analytical results.

A computer-based specimen analyzer 10 for analyzing specimens is illustrated in FIG. 1A. The computer-based specimen analyzer 10 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The skilled artisan will appreciate that other computer devices or systems may be utilized and that the computer systems described herein may be communicatively coupled to additional components, e.g. specimen analyzers, microscopes, or imaging systems, automated slide preparation equipment, etc. Some of these additional components and the various computers that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a bright-field imaging system, a multispectral imaging (MSI) system or a fluorescent microscopy system.

The images or image data (used interchangeably herein) may be acquired using the scanning device 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles, or a line scanner capable of scanning the image in a line-by-line manner, such as the VENTANA iScan HT scanner or the VENTANA DP 200 scanner (Ventana Medical Systems, Tucson, AZ). Alternatively, the images may be images that have been previously acquired (e.g. scanned) and stored in a memory 602 (or, for that matter, retrieved from a server via network).

The skilled artisan will appreciate that the digital color image acquired by the imaging apparatus 12 can be conventionally composed of elementary color pixels. Each colored pixel can be coded over three digital components, each comprising the same number of bits, each component corresponding to a primary color, generally red, green or blue, also denoted by the term "RGB" components.

In some embodiments, the images received as input are whole slide images. In other embodiments, the images received as input are portions of a whole slide image. In some embodiments, a whole slide image is broken down into several portions, e.g. tiles, and each portion or tile may be independently analyzed.

Figure 1B:
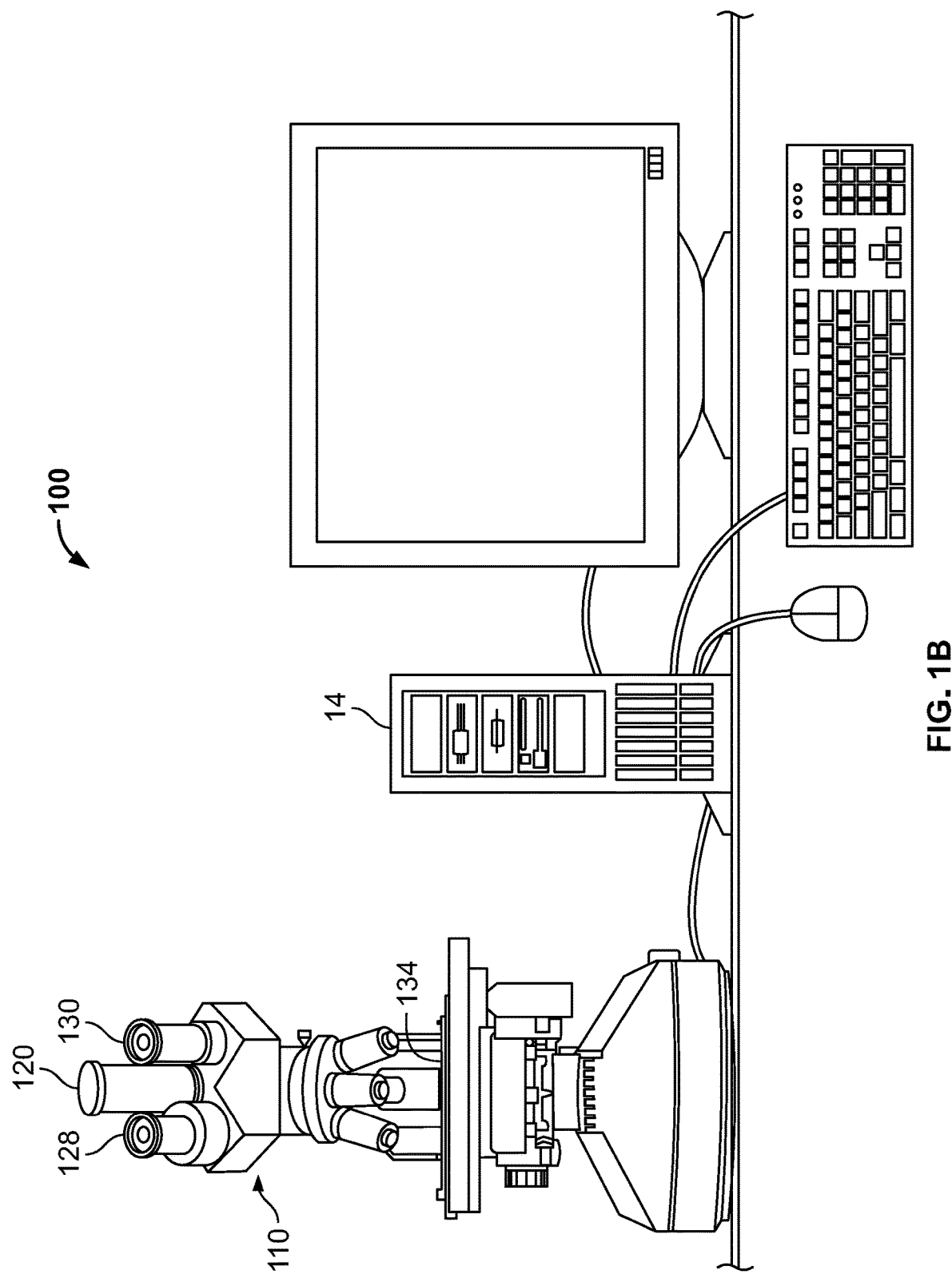
FIG. 1B illustrates an alternative digital pathology system including an imaging apparatus and a computer system.

FIG. 1B provides an imaging system 100 for imaging a specimen located on a specimen-bearing microscope slide 134 in accordance with one embodiment. The imaging system 100 includes a microscope 110, a computer 14, and an image capture device 120 (e.g. a camera or imaging sensor). The image capture device 120 is mounted on the microscope 110 and is in communication with the computer 14. Oculars 128, 130 can be used to directly view a biological specimen or the specimen may be viewed on the computer 14. As noted herein, the biological specimen may comprise one or more features of interest including targets (e.g., nucleic acids, antigens, etc.), labels (e.g., chromogenic labels, fluorescent labels, luminescent labels, radiometric labels, etc.), or cellular components (e.g. nuclei) or structures.

Figure 1C:
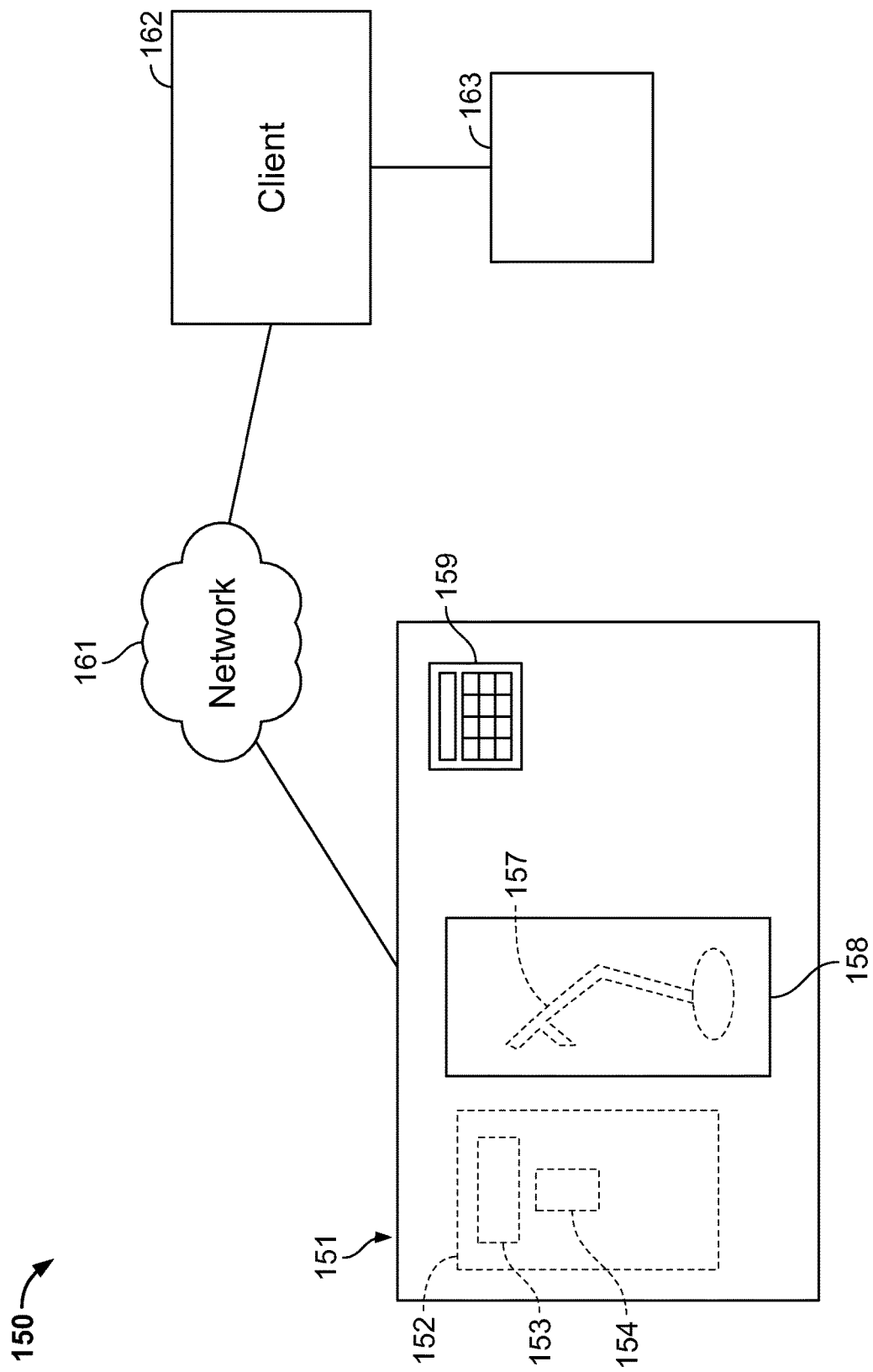
FIG. 1C illustrates another alternative digital pathology system including an imaging apparatus and a computer system.

FIG. 1C provides yet another alternative imaging system 150 including a multi-spectral imaging apparatus 151 and client computer system 162. Specimen-bearing microscope slides can be loaded into the imaging apparatus 152 which can provide narrow waveband or wavelength imaging, bright field imaging, and/or fluorescent imaging of the specimen-bearing microscope slides. The imaging apparatus 151 may further be a whole-slide scanner. For example, the whole-slide scanner is the VENTANA iScan HT or Ventana DP 200 Scanner, both available from Ventana Medical Systems, Inc. (Tucson, Arizona). The imaging system 150 can include a slide handler mechanism 157 movable to deliver one or more microscopes slides to the multi-spectral imaging apparatus and movable to remove one or more microscope slides from the multi-spectral imaging apparatus 151. The slide handler mechanism 157 may also be used to place or remove calibration samples and/or power sensors to enable automated calibration and/or re-calibration (such as after a predetermined time period, e.g. 50 hours, 100 hours, etc. of lamp use). The slide handler mechanism 157 can include one or more robotic arms, slide handlers operating in the x,y,z-coordinate axes, gripping mechanisms, transport devices, or the like capable of transporting microscope slides, calibration samples, and/or power meters between various locations. The images can be sent to the client computer system 162 either through a direct connection (not shown) or via a network 161. The client computer system 162 may be configured to display images on a display 163.

The imaging apparatus 151 can include, without limitation, one or more image capture devices 153 and one or more lenses 154. Image capture device 153 can include, without limitation, a digital imager (e.g., a digital camera) with an optical system imaging sensors (e.g., a charge-coupled device (CCD), a complimentary metal-oxide semiconductor (CMOS) image sensor, or the like), or the like. Lenses 154 can cooperate to provide focusing (e.g., auto-focusing). In some embodiments, the image capture device 153 has red, green and blue color channels for producing multispectral color images. The optical system 154 can include multiple and/or tunable filters, and multispectral or color image channels are created by acquiring multiple images using different filters and/or filter settings. The imaging apparatus 151 can also include an access door 158. In imaging apparatus can also include a controller. Slides can be loaded into the imaging system 151 via the access door 158, and the controller can be used to control operation of the imaging apparatus 152. The controller can include one or more programmable processors, storage devices, or the like, such as described herein.

Figure 2:
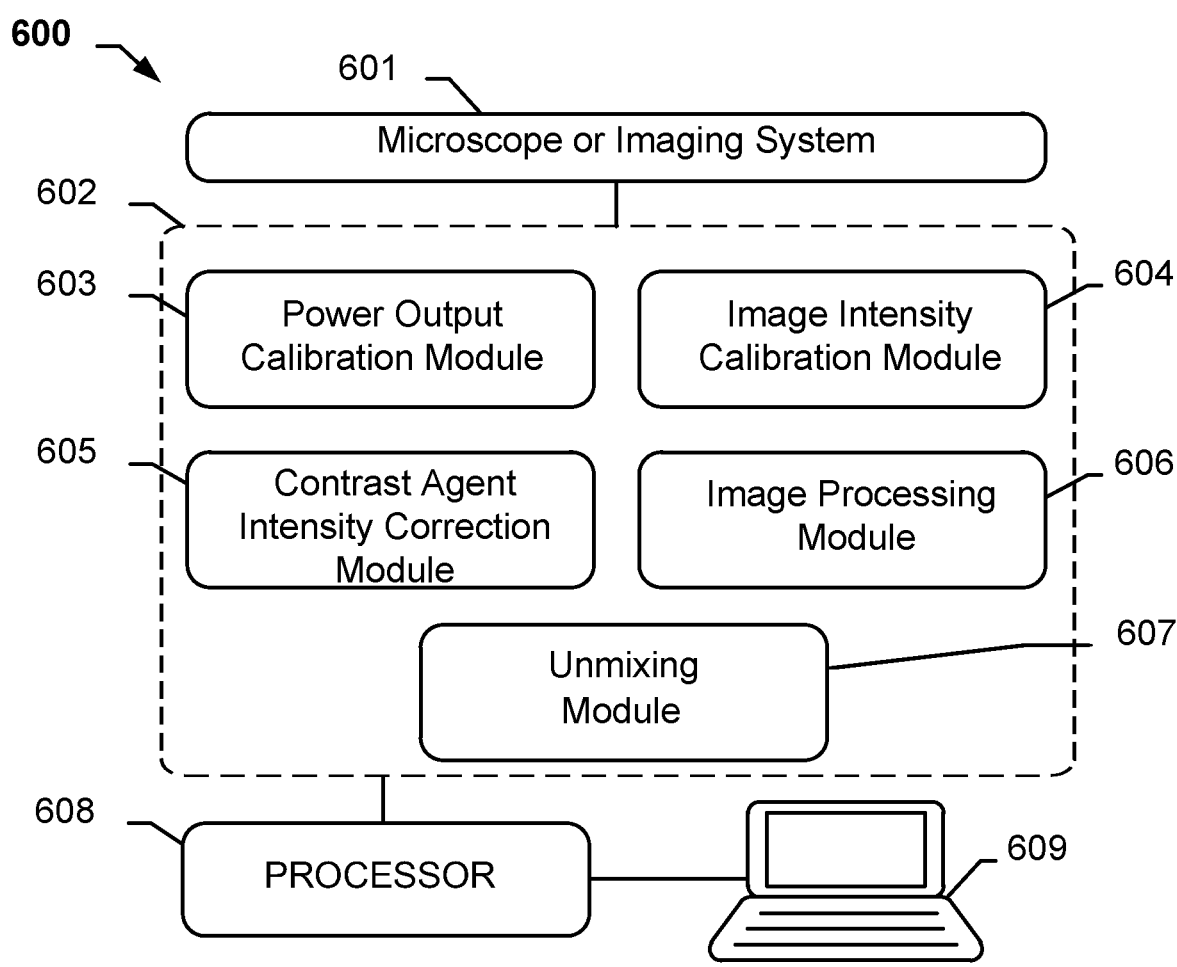
FIG. 2 sets forth various modules that can be utilized in a digital pathology system or within a digital pathology workflow.

With reference to FIGS. 1A and 2, the computer system 14 (or 609) can include a desktop computer, a laptop computer, a tablet, or the like, digital electronic circuitry, firmware, hardware, memory 602, a computer storage medium 602, a computer program (e.g. where the program is stored within the memory or storage medium), a processor 608 (including a programmed processor), and/or the like. The computing system 14 illustrated in FIG. 1 may comprise a computer with a display device 16 and an enclosure 18. The computer system can store digital images in binary form (locally, on a server, or another network connected device). The digital images can also be divided into a matrix of pixels. The pixels can include a digital value of one or more bits, defined by the bit depth.

Again, with reference to FIG. 1A, the network 20, in some embodiments, interconnects the imaging apparatus 12 and the computer system 14. The network 20 may include, without limitation, one or more gateways, routers, bridges, combinations thereof, or the like. The network 20 may include one or more servers and one or more websites that are accessible to users and can be used to send and receive information that the computer system 14 can utilize. A server may include, without limitation, one or more associated databases for storing information (e.g., digital images, algorithms, staining protocols, cutoff values for comparative evaluations, or the like). The network 20 may include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

FIG. 2 provides an overview of the various modules utilized within the presently disclosed digital pathology system. In some embodiments, the digital pathology system employs a computer device or computer-implemented method having one or more processors 608 and at least one memory 602, the at least one memory 602 storing non-transitory computer-readable instructions for execution by the one or more processors to cause the one or more processors to execute instructions in one or more modules (e.g. modules 603 through 607). Alternatively, the instructions may be stored in a non-transitory computer-readable medium (602) or computer-usable medium.

Figure 3:
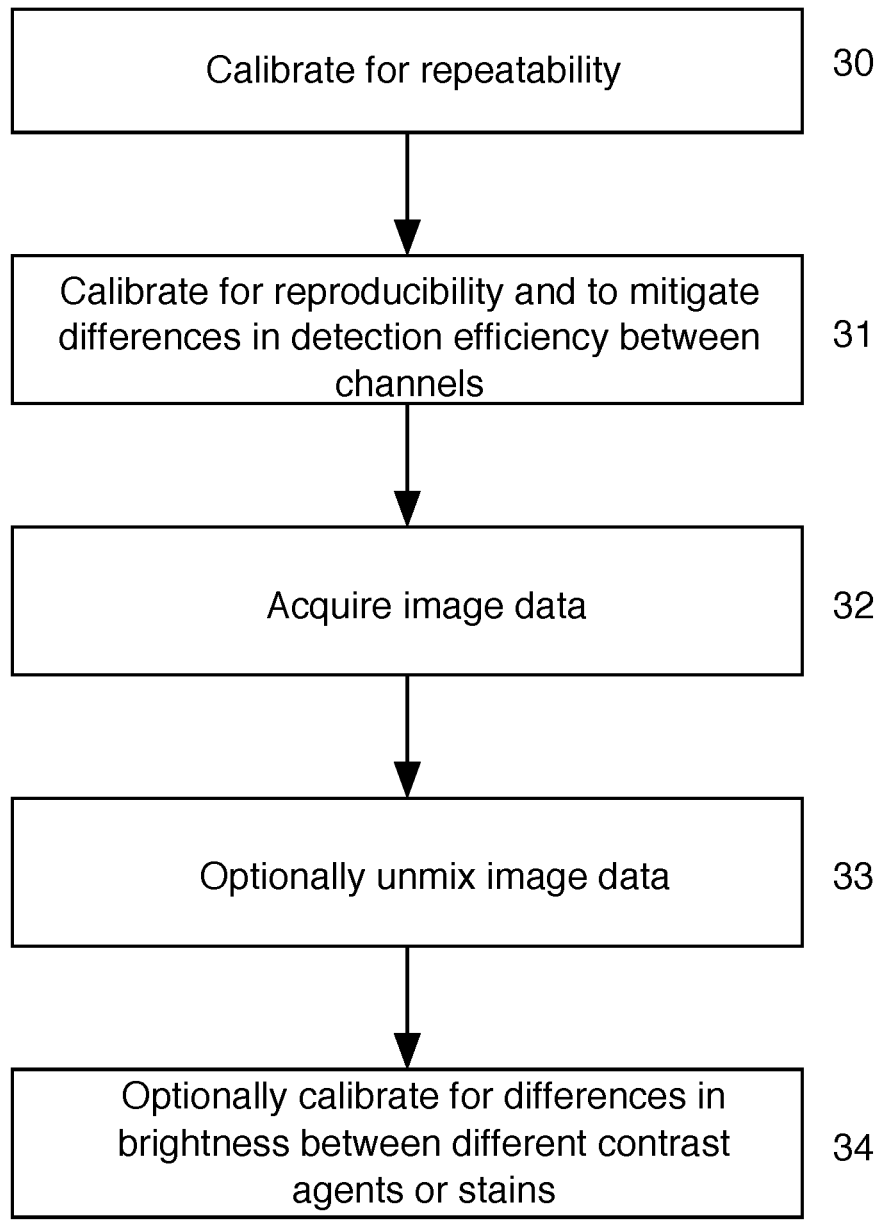
FIG. 3 sets forth an example of the general steps that can be used in acquiring calibrated image data.

With reference to FIGS. 2 and 3, the present disclosure provides systems and methods for imaging a biological sample stained with one or more stains, each stain identifying a particular target within the biological sample. In some embodiments, the method including the steps of (a) running a power output calibration module 603 to calibrate an imaging apparatus for repeatability (step 30); (b) running an image intensity calibration module 604 to calibrate the imaging apparatus for reproducibility and to mitigate differences in detection efficiency between channels (step 31); (c) collecting image data from a microscope or imaging system 601 and running an image processing module 606 to process the image data (step 32); (d) optionally running an unmixing module 607 to unmix the collected image data into individual image channel images (step 33); and (e) optionally running a contrast agent intensity correction module 605 to calibrate for differences in brightness between different contrast agents (step 34). In some embodiments, the various modules may operate to set or adjust the imaging system components (e.g. a light source or camera) using pre-existing calibration data. In other embodiments, the various modules may operate to set or adjust the imaging system components (e.g. a light source or camera) based on calibration data collected in real-time. Of course, the skilled artisan will recognize that any of the instructions, algorithms, and filters described for use within each module may be adapted or changed based on the types of images acquired and/or the type of specimens being studied. The skilled artisan will also appreciate that additional modules may be incorporated into the workflow. For example, an image processing module 606 may be run to apply certain filters to the acquired images or to identify certain histological and/or morphological structures within the tissue samples.

Calibration Overview

One aspect of the present disclosure is a system and method of calibrating a microscope or an imaging system 601 prior to acquiring image data of a sample. In some embodiments, the sample is a biological sample which has been stained in an assay to identify one or more targets (e.g. proteins, nucleic acids, etc.) within the sample.

For example, the biological sample may be stained through application of one or more stains, and the resulting image or image data includes signals corresponding to each of the one or more stains. In some embodiments, the biological sample may be stained in a multiplex assay for two or more stains (thus providing multiplex images). In some embodiments, the biological samples are stained for at least two biomarkers. In other embodiments, the biological samples are stained for the presence of at least two biomarkers and also stained with a primary stain (e.g. hematoxylin). In some embodiments, the biomarkers are protein biomarkers and/or nucleic acid biomarkers (e.g. DNA, RNA, microRNAs, etc.).

In some embodiments, a biological sample or tissue sample is processed in an automated staining/assay platform that applies a stain to the sample. There are a variety of commercial products on the market suitable for use as the staining/assay platform, one example being the Discovery™ product of Ventana Medical Systems, Inc. (Tucson, AZ). As noted herein, the camera platform may also include a bright field microscope, such as the VENTANA iScan HT or the VENTANA DP 200 scanners of Ventana Medical Systems, Inc., or any microscope having one or more objective lenses and a digital imager. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

Figure 4:
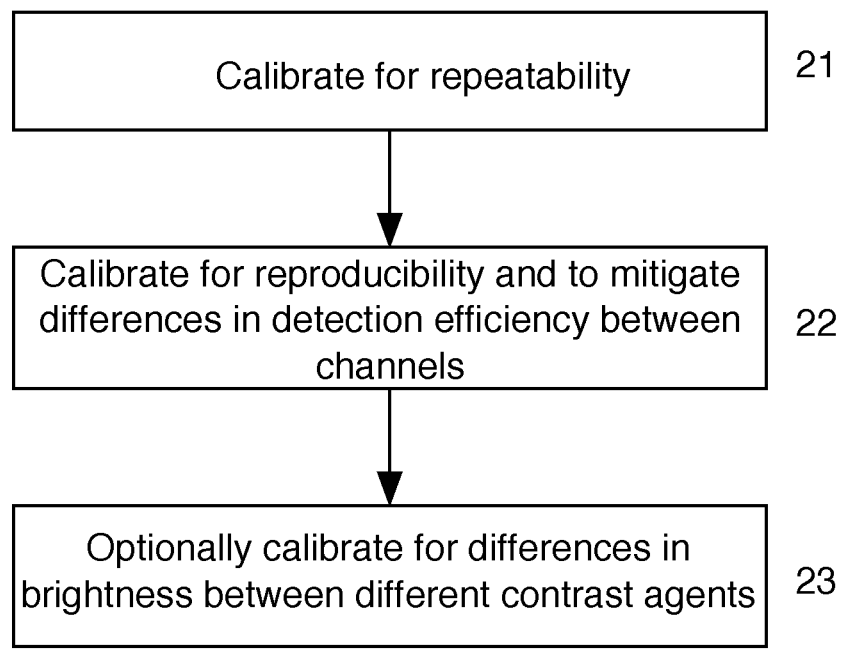
FIG. 4 provides an overview of an embodiment of the steps for calibrating an imaging system.

In some embodiments, the present disclosure provides for a system level calibration procedure including at least two calibration steps. With reference to FIG. 4, in some embodiments, a first calibration step is used to calibrate for repeatability (step 21) and to mitigate for differences in the illumination power between channels. This step permits sample illumination to be standardized to a unit of measure so that it can be repeated on a given instrument or reproduced on other instruments. A second calibration step can be used to calibrate for reproducibility and to mitigate for differences in detection efficiency between channels (step 22). An optional third calibration step calibrates for differences in brightness between different contrast agents (step 23). Each of these calibration steps and how they may be implemented in an imaging system are described herein.

There are four concerns associated with multispectral instruments that are addressed by the calibration procedures described herein. First, is the issue of repeatability, or the ability to repeatably capture data from a calibration standard and have the results be identical. Without wishing to be bound by any particular theory, it is believed that unless the illumination is calibrated to be able to reproduce an exact value at the sample plane, the data will not be repeatable. For example, an X % power output from an illumination source may provide about 50 mW of power one day and about 48 mW power a week later. By calibrating to units of measure (milliWatts), the instrument can be set to the same illumination power (e.g. a predetermined light source power output based on a power level called for within a particular assay) by "dialing-in" a percent power output of the light source using calibration data.

The second is the issue of reproducibility, or the ability to reproduce data from a standard on different (identically configured) instruments and have the results be reproducible. Without wishing to be bound by any particular theory, it is believed that unless there is a correction factor for small tolerance differences in the optical elements throughout the system, the results will be measurably different from instrument to instrument. For example, a X % output on instrument A may be different than X % output on instrument B. But, by using an absolute unit, e.g. milliWatts, an operator can "dial-in" about 50 mw on both instrument A and on instrument B.

The third issue addressed by the calibrations is the difference in detection efficiency from channel to channel. This third issue is somewhat analogous to the situation outlined in with regard to "reproducibility," but for the illumination path instead of the detection path. This third issue arises from differences in (i) the efficiency of the camera chip at different wavelengths, (ii) the bandwidths of each channel, and/or (iii) the transmission of the optics at different wavelengths. It is believed that the calibration procedures described herein compensate for these differences by correcting for differences using different calibrated exposure times for each channel. It is further believed that there will be differences in delivery of illumination between channels and creating the "lookup table" of percent output versus power for each channel is helpful to being able to produce equal illumination from channel to channel.

The fourth problem resolved is the tendency for instrument operators to incorrectly interpret relative intensity to reflect relative amount of the contrast agent (or dye) present. By using knowledge of the properties of the stain or contrast agent, the data can be corrected to produce images that can be interpreted directly as indicating the relative amount of stain or contrast agent present within the sample, which can be especially useful in the early research process for characterizing new enzymes and staining technologies.

Calibration for Repeatability/Power Output Calibration Module

The system level calibration of the present disclosure employs a first calibration for repeatability, i.e. a light or illumination source output is calibrated to a known power measured at the sample plane for each increment of power over an adjustment range and for each channel (steps 21 and 30). More specifically, the calibration performed at steps 21 and 30 calibration (a) ensures repeatability within an instrument; (b) ensures reproducibility in illumination between instruments (units of measure allow an operator or instrument to reproduce "X"-milliWatts on both a first and second instrument); and (c) ensures equal illumination from channel to channel.

In some embodiments, power output calibration data as computed by the power output calibration module 603 is used to enable adjustment of a light source of a microscope or imaging system 601 to provide an equal amount of known power at the sample plane for every imaging channel. In some embodiments, the power output calibration data comprises a table of power output levels as they correspond to power values as measured (or interpolated) at the sample plane. In other embodiments, the power output calibration data is a calibration curve correlating power output levels to measured power values. In some embodiments, the power output calibration data is stored in non-transitory computer-usable medium 602 and may be used to set or adjust an illumination output of a light source prior to acquiring image data.

In order to compensate for differences in the efficiency of light delivery between two identical imaging systems and/or changes in this efficiency on a single system over time, calibration of an illumination output at the sample plane of the imaging system is performed such that all optical elements in the light delivery path are accounted for. It is believed that this calibration procedure enables the sample illumination output to be standardized to a unit of measure (e.g. milliWatts), rather than a percent output. In this way, the illumination output can be repeated on a given instrument and/or reproduced on other instruments. Again, it is believed that the ability to report illumination levels at the sample plane in standardized units of measure is important for being able to perform root cause analysis of weak images and/or isolate potential flaws in the illumination delivery subsystem (e.g. deterioration of light guides, deteriorating filters, and/or cracked relay lenses).

Figure 5A:
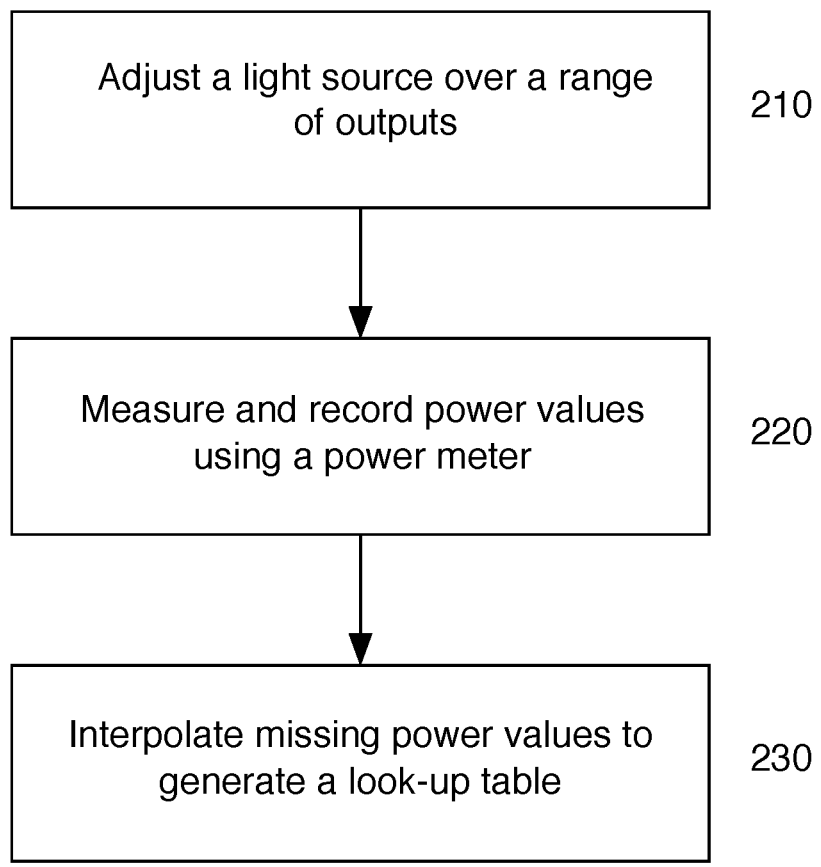
FIG. 5A provides an overview of an embodiment of a calibration procedure for repeatability.

In some embodiments, the calibration for repeatability comprises calibrating the light source to absolute units of optical power with respect to the sample plane. This is achieved by deriving calibration data (e.g. a table of recorded values (a "look-up" table) or a calibration curve) for a percent power output of a light source versus actual recorded power values. With reference to FIG. 5A, a light source is adjusted over a range of outputs (step 210) and the actual power values (e.g. in milliWatts) are measured (step 220) using a power meter or other sensor at the sample plane. The values or percent power output versus actual measured power are recorded. In some embodiments, missing values are interpolated (step 230) to provide power output calibration data (e.g. a table of look-up values).

Figure 5B:
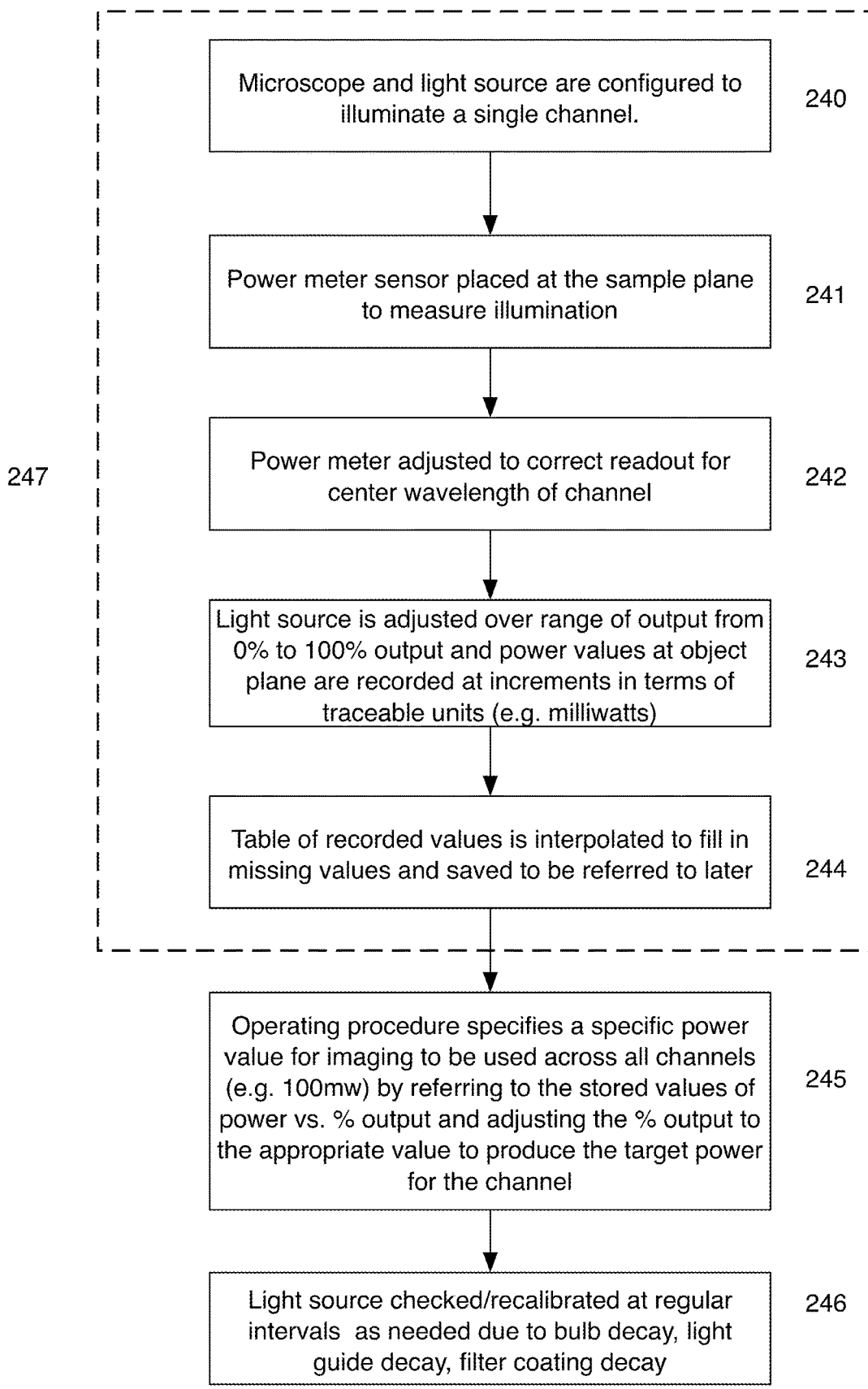
FIG. 5B sets forth a representative procedure for calibrating an imaging system for repeatability.

More specifically, and with reference to FIG. 5B, the microscope and light source are first configured to illuminate a first channel (step 240). This may be accomplished by selecting, for example, a particular wavelength band on the light source or changing a filter on the microscope (or camera). In some embodiments, the light source is one which is adjustable to permit discrete output levels covering a range from zero output to 100 percent output.

In some embodiments, in order to isolate the illumination subsystem from the detection subsystem, a small sensor (e.g. a power meter or illumination meter) is placed at the sample plane (step 241). In some embodiments, a power meter is used to measure the power output of the light source at the sample plane, i.e. through the optics (e.g. objective lens and/or tube lens) and calibration sample. In some embodiments, the power meter is used to measure the optical power output in watts at the specimen level. One suitable power meter is the X-Cite® Optical Power Measurement System available from Excelitas Technologies Corp.

Next, the power meter is adjusted to correct for the readout of a center wavelength of the first channel (step 242). In some embodiments, this is accomplished by entering the center wavelength information into the interface of the commercially calibrated power meter. In other embodiments, especially where modern power meters are utilized, the wavelength to be measured is simply "dialed-in" or "selected."

Subsequently, the light source is adjusted over a range of outputs from zero to about 100% output, and power values at the object plane are recorded at increments in terms of traceable units (e.g. milliWatts) (step 243). In some embodiments, the light output at the sample plane is measured at predetermined regular increments (e.g. 5%, 10%, 15% increments, etc.). The power values determined at each output level are then used as power output calibration data, e.g. a table of recorded measured values at the sample plane as a function of the output level of the light source. This table of values can be used (such as in an automated imaging system) to "look up" an appropriate output level to produce (or reach) an appropriate power value at the sample plane for the particular imaging channel. In some embodiments, the appropriate power value may be a power value required by a particular assay or protocol. The skilled artisan will appreciate that values in-between measured values can be interpolated, for instance, using linear interpolation, or cubic spline interpolation if the relationship between percent output and power is not linear (step 244). Linear interpolation is a method of curve fitting using linear polynomials to construct new data points within the range of a discrete set of known data points. The spline interpolation is based on an interpolation interval divided into small subintervals. Each of these subintervals is interpolated using the third-degree polynomial. The polynomial coefficients are chosen to satisfy certain conditions (these conditions depend on the interpolation method). General requirements are function continuity through all given points. There could also be additional requirements: function linearity between nodes, continuity of higher derivatives and so on. Sets of linear equations solved to construct splines are typically very well-conditioned, therefore, the polynomial coefficients are calculated precisely.

As illustrated in FIG. 5B, steps 240 through 244 may be repeated for each channel, e.g. second, third, fourth, and so on up to nth channels (indicated by the dashed line at step 247). An appropriate table of lookup values may be generated for each of the channels, i.e. the table values for measured power and output settings should be determined for each illumination wavelength channel. With this information, all channels can be configured to illuminate the sample with the same power (such as a predetermined power value as established by an assay or protocol), i.e. the power output of a light source may be adjusted for each channel to be imaged based on the existing calibration data for that image channel. It is believed that this may help facilitate better channel separation and better quantitation.

Once the power output calibration data is generated, it may be used to automatically set illumination levels of a light source of an imaging system such that the illumination levels match a predetermined power value called for by a particular assay or protocol. For example, operating procedures may require a specific predetermined power value for imaging to be used across all channels (e.g. 100 mW), and such a predetermined power value may be reached using the power output calibration data derived by the power output calibration module 603 and stored in memory 602. For example, a specific assay may call for a specific power value to be used across all channels. By referring to the stored values of power versus percent output and adjusting the percent output to the appropriate value, the target power for the particular channel may be reached (step 245). In some embodiments, the calibration data can be stored in non-transitory computer memory 602 and used to automatically adjust a computer controlled illumination source to produce a standardized power at the sample plane for each imaging channel each time the imaging instrument is used.

The skilled artisan will also appreciate that the calibration data (i.e. the calibration curve or table of values) may need to be periodically updated to confirm or re-populate the characteristics of the illumination source as it changes over time (step 246). As such, the steps of FIG. 5B may be repeated at set time intervals or set intervals based on the operational time of the illumination source or other microscope components. The skilled artisan will appreciate that the regularity of re-establishing the lookup table depends on the light source technology and the desired precision (for example, arc lamps may require much more frequent re-calibration than LED sources).

Calibration to Increase Reproducibility and to Mitigate Differences in Detection Efficiency Between Channels/Image Intensity Calibration Module In order to standardize the imaging performance between channels and between systems, a second level of calibration may be employed that isolates and/or compensates for differences in the detection path of the imaging system (steps 22 and 31). More specifically, the second calibration performed at steps 22 and 31 helps ensure repeatability between instruments (e.g. between first and second instruments) and helps compensate for differences in detection efficiency from channel to channel.

It is believed that this second level of calibration helps ensure (i) that small differences in the optical elements between instruments are calibrated; and (ii) that differences between wavelength channel detection efficiency between channels are calibrated such that a standard of known luminescence is accurately represented in the data collected across channels. As such, it is believed that data acquired following calibration (step 22 or 31) represents actual signal coming from the sample for each imaging channel. Without wishing to be bound by any particular theory, it is believed that while the system and procedure for calibrating light delivery to standardized levels at the sample plane (step 21 or 30) is important, it does not account for the image forming optical train leading to the camera. Thus, simply ensuring that a standardized amount of light is delivered to the sample may not ensure that the images captured will be equivalent between two (or more) similar microscopy systems, or two or more channels on the same system.

In some embodiments, the image intensity calibration data from this step (i.e. calibrated exposure times and the ratio between channels) may be in stored in a non-transitory computer readable memory 602 and, at runtime, the image intensity calibration data may be used to automatically adjust channel exposure times to maintain a set ratio based on standard target intensity values of a calibrated sample as noted herein. In some embodiments, the image intensity calibration data comprises (i) a ratio of target intensities; (ii) target intensity values at the camera/sensor; and/or (iii) a ratio of exposure times.

Figure 6:
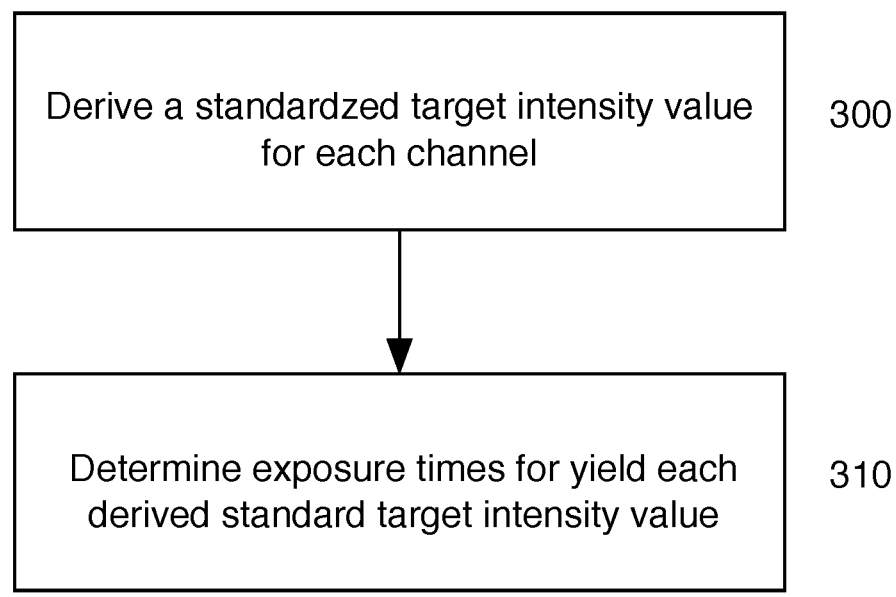
FIG. 6 provides an overview of a representative calibration procedure for reproducibility.

With reference to FIG. 6, calibration for reproducibility involves two steps. First, a standardized target intensity (STI) is derived for each channel (step 300). It is believed that different imaging channels within an imaging system will have different efficiencies for detecting signal from fluorophores or chromogens due to having differing (i) filter bandwidths, (ii) wavelength dependencies in transmission of the lenses, and/or (iii) wavelength dependencies of the camera detector. To compensate for this, the known relative brightness of the calibration sample at each illumination wavelength is used to determine the STI for each channel. Subsequently, exposure times are determined based on the derived STI values (step 310).

A calibration sample (e.g. a standardized photoluminescent sample that will not photobleach) can be utilized in this second calibration procedure. In general, calibration samples of this type permit use of the actual filters and mirrors used for imaging in each channel. In some embodiments, the calibration sample has a large homogeneous area to image such that the average intensity of the homogeneous feature over many pixels can be averaged. In some embodiments, the calibration sample is a stable fluorescent standard sample and/or an imaging filter cube. In some embodiments, the stable fluorescent standard is an Argo-M slide available from Argolight (Pessac, France). Other examples include freshly prepared standard solutions of fluorescent dye in carefully controlled concentrations, radioactive samples such as tritium-based luminescent standards, fluorescent phosphor slides, quantum dot preparations, and/or mirror or partial mirror slides with known reflectivity across the visible spectrum.

In some embodiments, the calibration sample is placed on the microscope stage. In some embodiments, the microscope camera's binning and exposure time are set such that the calibration sample is able to be viewed in real time, e.g. in a "live view" mode. In some embodiments, an objective lens is selected such that features (e.g. fluorescent features) within the calibration standard fills the entire camera view of view (e.g. a 20×objective lens, a 1.6×tube lens). The selected feature is then focused into view. Following focusing, the sample is illuminated at a standardized power, and the exposure is adjusted to produce a pre-determined image intensity.

Figure 7A:
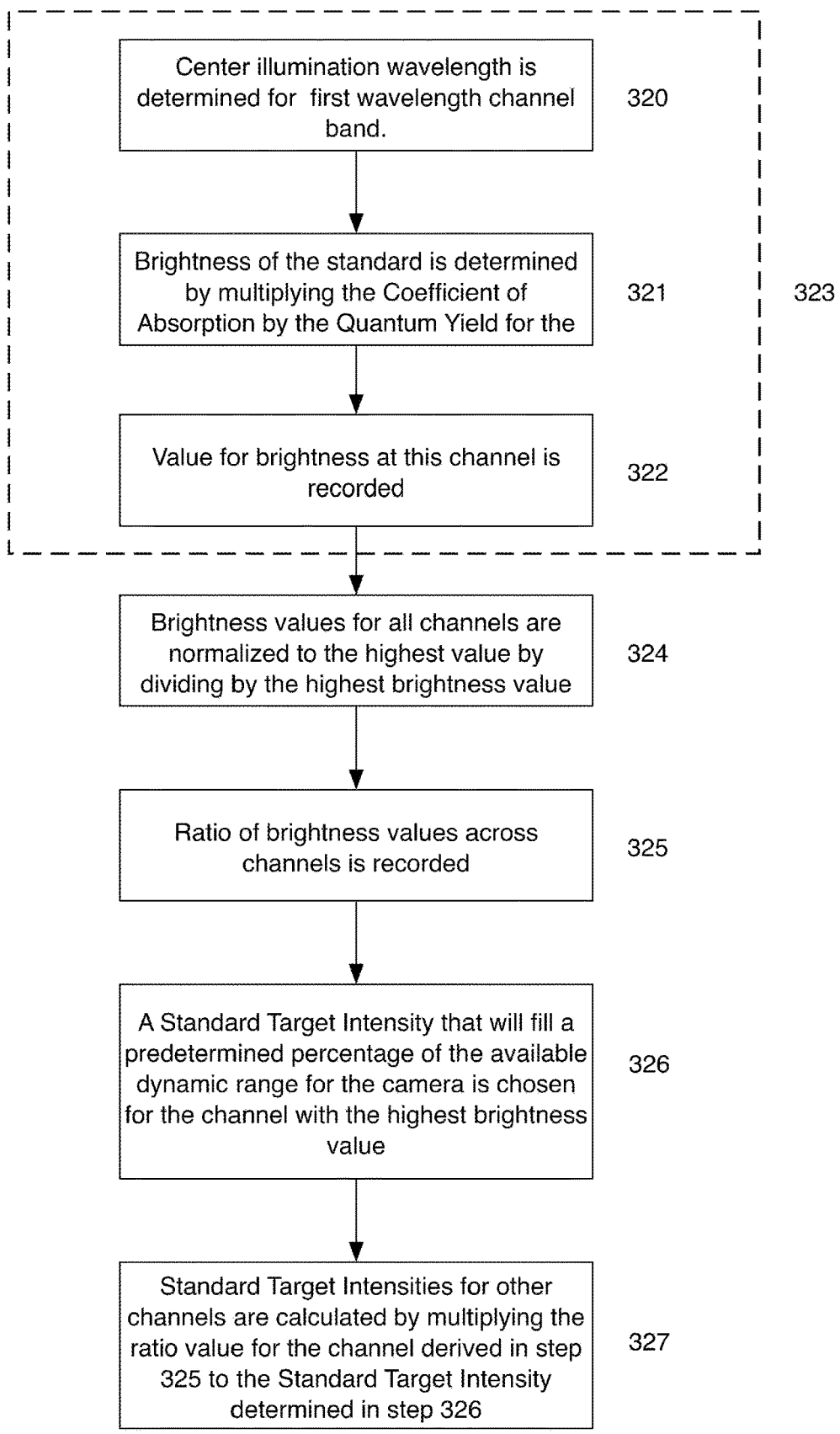
FIG. 7A illustrates an example of the steps for deriving standard target intensity values.

With reference to FIG. 7A, a center illumination wavelength is determined for a first wavelength channel band (step 320). The brightness of the calibration standard is then calculated from the absorption coefficient at a given wavelength multiplied by the quantum yield of the standard at the same given wavelength (step 321) and this value is recorded (step 322). A value for brightness is calculated for each image channel to be imaged (step 323), i.e. steps 320, 321, and 322 may be repeated (dashed lines of step 323) for each image channel to be imaged.

Subsequently, the brightness values thus determined are normalized to the brightest value by dividing by the brightest value (step 324). As a result, brightness values at wavelengths that do not produce the brightest value will be some decimal fraction of the brightest value. Following normalization, the ratio of brightness values across all channels is recorded (step 325). Finally, a STI value that fills a predetermined percentage of available dynamic range for the imaging system is chosen for the channel with the highest brightness value (step 326). In some embodiments, the predetermined percentage of available dynamic range is about 50%. In other embodiments, the predetermined percentage of available dynamic range is about 60%. In some embodiments, the predetermined percentage of available dynamic range is about 70%. In some embodiments, the predetermined percentage of available dynamic range is about 80%. In some embodiments, the predetermined percentage of available dynamic range is about 85%. In some embodiments, the predetermined percentage of available dynamic range is about 90%. In some embodiments, the predetermined percentage of available dynamic range is about 95%.

Deriving the STI values for every image channel (step 327) can include selecting a desired intensity value for the wavelength at which the brightest value is generated, and then multiplying that value by a decimal fraction calculated for the other channels. For example, the STI values for other channels may be calculated by multiplying the ratio value for the particular channel from step 325 by the STI determined at step 326. In this way, the STI for each channel represents the estimate of how bright the sample actually is at each illumination wavelength.

Figure 7B:
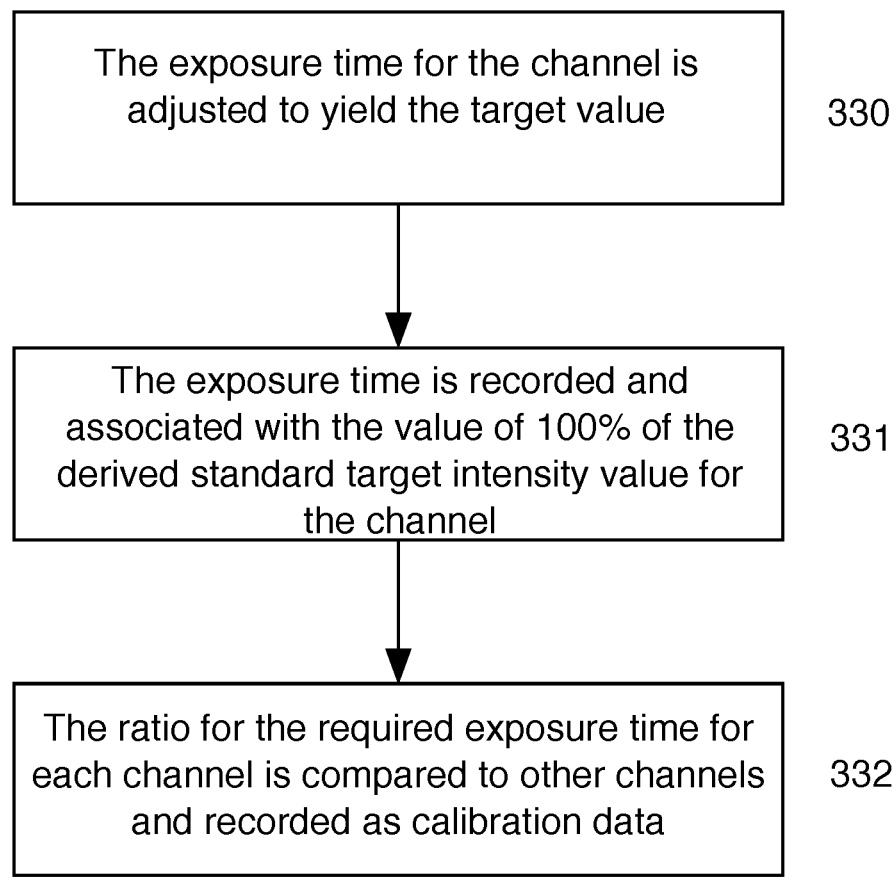
FIG. 7B illustrates an example of the steps for computing exposure times.

After the STI values for each channel are derived (step 327), the values can be used to determine exposure times for each channel (step 310). With reference to FIG. 7B, first an exposure time is adjusted such that a target STI value is reached (e.g. an exposure time that would provide 1000 counts at a sensor) (step 330). Next, the exposure time is recorded (such as in a memory) and associated with the value of 100% of the derived standard target intensity value for that particular channel (step 331). A ratio of each exposure time across each channel is recorded (step 332) and used as image intensity calibration data.

Figure 8:
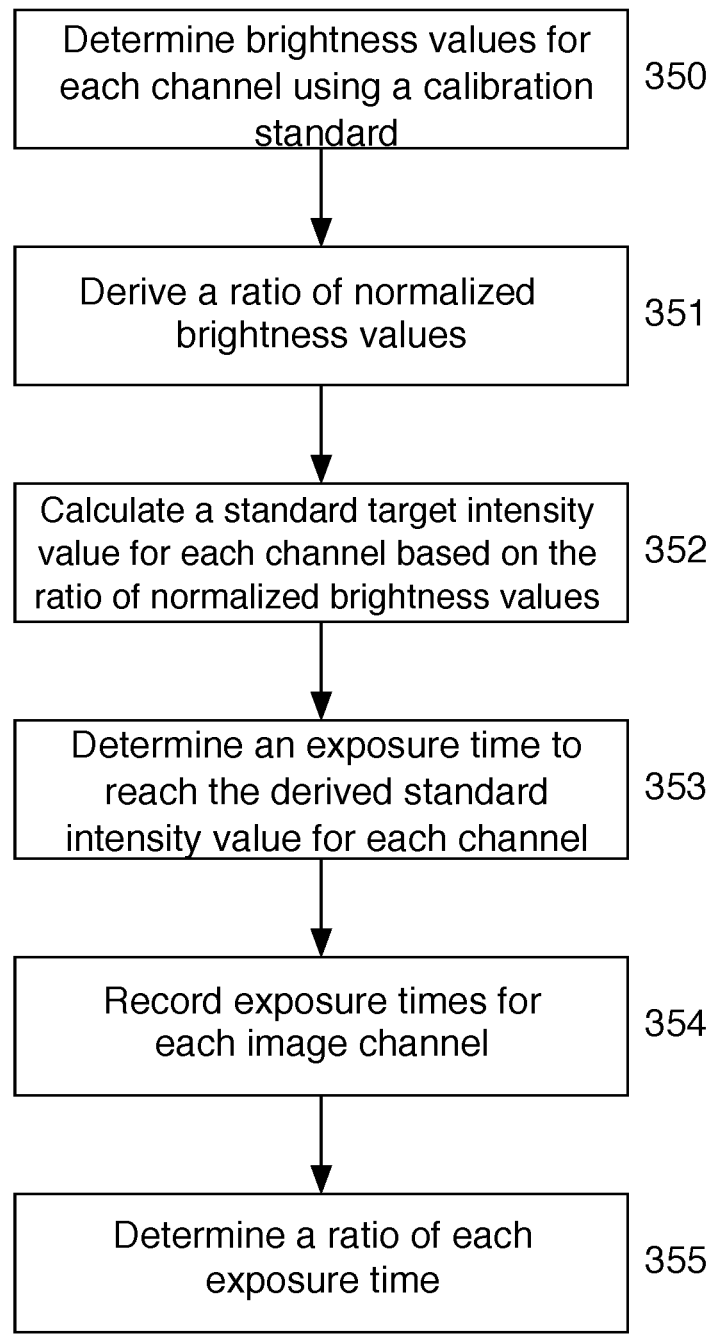
FIG. 8 illustrates an alternative procedure for determining exposure times for standard target intensity values.

FIG. 8 sets forth another flowchart illustrating the steps of the second calibration procedure. At step 350, the brightness values of a calibration standard at each image channel are determined. In some embodiments, the brightness values may be determined by multiplying a coefficient of absorption by a quantum yield. The fluorescence quantum yield is defined as the number of photons emitted divided by the number of photons absorbed, with an efficiency of 1.0 being the maximum possible value. Since it is difficult to know the precise number of photons absorbed without specialized instrumentation, the typical practice of measuring quantum yield depends on comparing the unknown to a known standard.

After the brightness values are determined, a ratio of normalized brightness can be derived (step 351). For example, assuming the brightness is known for three image channels (Channel 1 ("CH1"), Channel 2 ("CH2"), and Channel 3 ("CH3") at a given illumination power level, each brightness value may then be divided by the highest brightness value to normalize the values. For example, if the brightness values are 738, 820, 697, then after normalization these brightness values become 0.9, 1, and 0.85. The ratio of normalized brightness values would, in this example, be 0.9:1:0.85.

Next, a standard target intensity value can be calculated (step 352) for each image channel based on the ratio of normalized brightness values. An initial standard intensity value may be set for the channel having the highest brightness value. In the example above, 1000 counts could be assigned to CH2. Then, the standard intensity value for each other channel could be derived by multiplying the determined ratio by the initial standard intensity value (for this example, 900, 1000, 850 counts).

Subsequently, an exposure time can be derived for each channel (step 353), the exposure time derived by adjusting the exposure setting of a camera or sensor to yield the target standard intensity value for that channel. As applied to the example above, to reach 900 counts on CH1, the shutter or sensor may need to be exposed for 50 ms. Likewise, for CH2 and CH3 the exposure time could be 40 ms (to reach 1000 counts) and 60 ms (to reach 850 counts), respectively. These exposure times are recorded (step 354) and the ratios of each exposure time relative to one another are derived (step 355). For example, the ratios for CH1:CH2:CH3 would be 50:40:60, or 0.8:0.66:1.

The above-identified exposure time ratio could then be used as image intensity calibration data when imaging a tissue sample with an imaging system. For example, if a protocol calls for 150% of a standard target intensity, the exposure time ratios may be used to provide new exposure times for each channel. For the ratio 0.8:0.66:1, dividing each value by 0.8 provides the ratio 1:0.83:1.25. For CH1, where a 50 ms exposure time was used at 100% of the standard intensity value (1000 counts), at 150% of the standard intensity value, we arrive at an exposure time of 75 ms (50 ms×1.5). The new exposure times for CH2 and CH3 are likewise calculated to provide 62 ms and 93 ms exposure times, respectively.

Though this calibration can be accomplished in a simple manner manually by recording values on paper and using a calculator to derive the STI values for each channel and the needed exposure times, the calibration is more conveniently accomplished in software, where the data table is held in a non-transitory computer readable memory (602) and used by the instrument (606) to calculate the proper exposure times (604) to achieve a STI across channels that will be the same as other systems with their own respective data on exposure times held in computer memory.

Periodically, the ability to achieve STI values across channels should be confirmed on the imaging system by placing the calibration standard on the system, selecting an exposure of the STI, collecting image data, and measuring the values produced in the data to confirm they match the per channel STI values. This ensures that the instrument is functioning properly and deterioration of the optics has not occurred. This can be automated, for example, by programming the imaging system to place (e.g. with a robotic arm, actuator, or other transport device) a calibration sample on an imaging platform, and then repeating the steps outlined above.

As an alternative to the procedures described above, the offset in the light level for each channel may be adjusted. In general, adjusting the exposure time might be preferable as it is believed to generally be easier to adjust exposure time with high resolution, and it is easier to facilitate maintaining the illumination power the same for each channel.

Calibration to Relative Brightness of Stains Using in an Assay/Contrast Agent Intensity Correction Module A third calibration procedure (step 23 or 34) may optionally be applied to adjust captured images to reflect a quantity of material creating the contrast rather than the relative intensity of the signal and aid in interpretation of the pixel values in the resulting image. For example, given an identical amount of two fluorophores in a sample, fluorophore 'A' may produce more signal than the same amount of fluorophore 'B.' This may, in some instances, make studies on chemistry performance difficult to interpret. Therefore, this calibration provides an optional adjustment to the image to make the data directly account for an amount of material present on or within the sample.

Figure 9A:
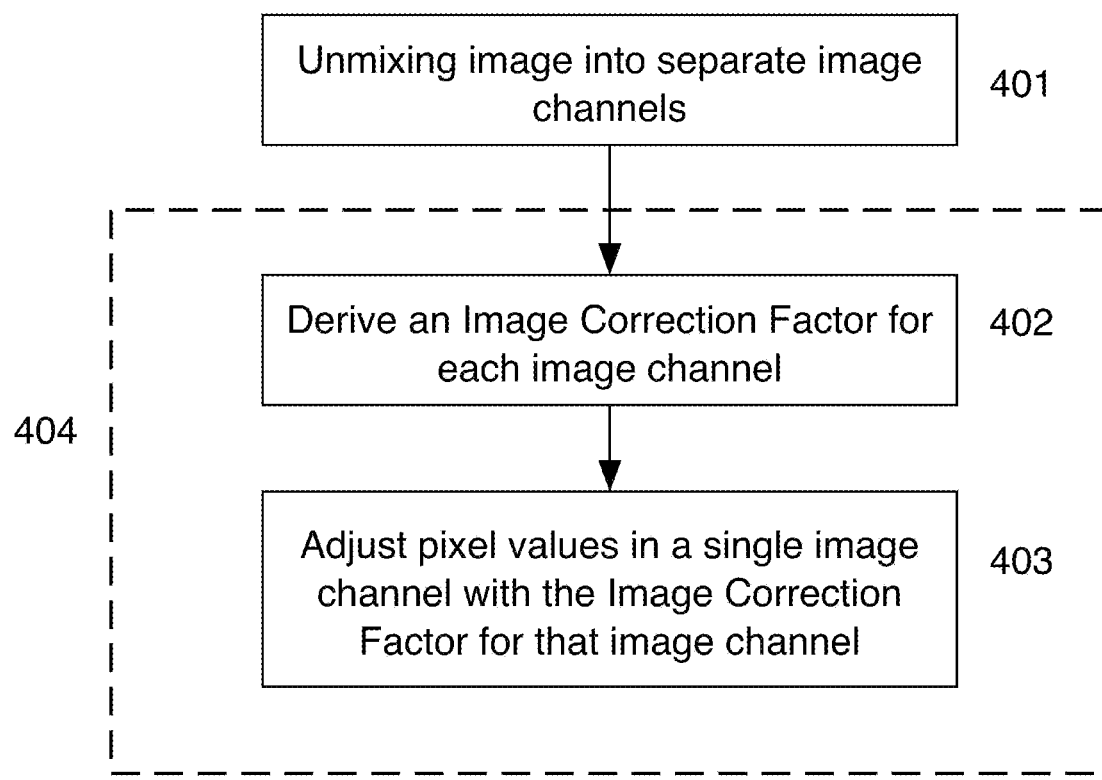
FIG. 9A sets forth an embodiment of the general steps of adjusting pixel values using an image correction factor.

A third calibration is illustrated in FIG. 9A. Generally, after an image is optionally unmixed at step 401 using an unmixing module 607, an image correction factor for each contrast agent (or stain) is derived (step 402) using the contrast agent intensity correction module 605. The image correction factor from step 402 is then applied against the pixel values (step 403) in each single channel image. Steps 402 and 403 may be repeated any number of times (404) for each contrast agent or stain being analyzed to provide a series of image correction factors.

Figure 9B:
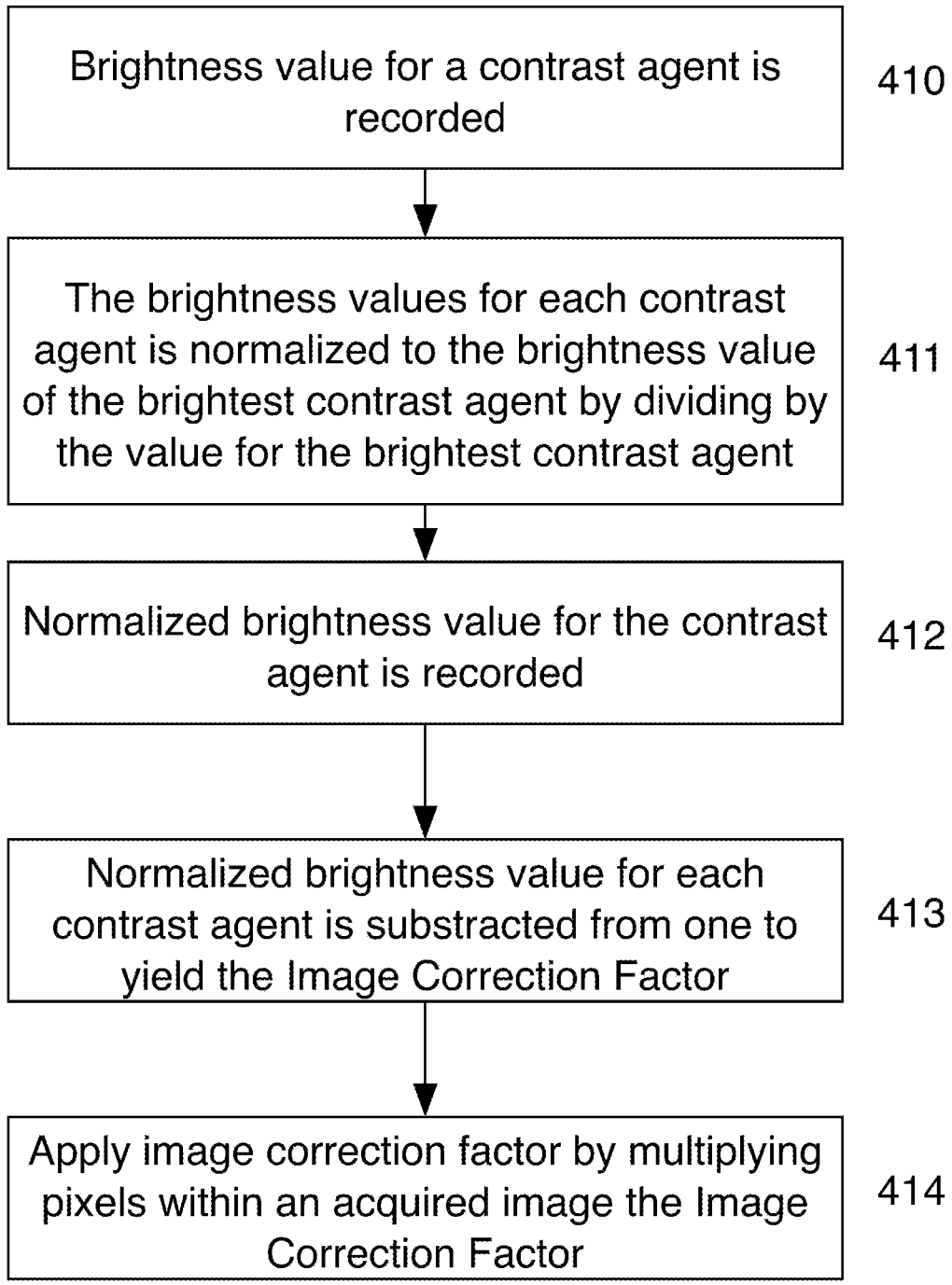
FIG. 9B provides an overview of an embodiment of the steps that can be used to derive and apply an image correction factor.

More specifically, and with reference to FIG. 9B, the relative brightness for each contrast agent (e.g. fluorophore) corresponding to a detection channel (step 411) is determined. The skilled artisan will appreciate that brightness is determined (step 410) by multiplying the absorption coefficient of a calibration sample by the quantum yield of the calibration sample at a given wavelength (e.g. an excitation wavelength), such as noted herein. Once determined, the brightness values for fluorophores at channel excitation wavelengths may be stored in a database, such as within image analysis software. For a given set of dyes, used in an assay, the brightness values can be recalled and normalized to the brightest value to produce decimal fractions (step 412). Then, each decimal fraction is subtracted from the integer 1 to derive an Image Correction Factor, i.e. an amount to adjust pixel values (step 413). Finally, the pixel values for a given channel within an acquired image are multiplied by Image Correction Factor to compensate for differences in absorption and quantum yield of different dyes (414).

Unmixing Module

In multispectral imaging, linear unmixing may be performed (step 33) with an unmixing module 607 to separate bleed-through of signal into neighboring channels and to remove extraneous signals such as constitutive autofluorescence from the sample. The relative brightness calibration of step 34 can be optionally performed on images produced after linear unmixing, as these images are believed to represent the pure signal contribution of the dye (e.g. fluorophore) of interest. The calibration of image data may be an option for viewing/analyzing images in software can be reversible and triggered through a GUI element such as a check-box.

In some embodiments, in a sample comprising one or more stains, individual images may be produced for each channel of the one or more stains. The skilled artisan will appreciate that features extracted from these channels are useful in describing the different biological structures present within any image of a tissue (e.g. nuclei, membranes, cytoplasm, nucleic acids, etc.).

The multi-spectral image provided by the imaging module 601 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with unmixing module 205 using liner unmixing. Linear unmixing is described, for example, in 'Zimmermann "Spectral Imaging and Linear Unmixing in Light Microscopy" Adv Biochem Engin/Biotechnology (2005) 95:245-265' and in in C. L. Lawson and R. J. Hanson, "Solving least squares Problems," PrenticeHall, 1974, Chapter 23, p. 161,' the disclosures of which are incorporated herein by reference in their entirety. In linear stain unmixing, the measured spectrum $(S(\lambda))$ at any pixel is considered a linear mixture of stain spectral components and equals the sum of the proportions or weights (A) of each individual stain's color reference $(R(\lambda))$ that is being expressed at the pixel $$S(\lambda)=A1 \cdot R1(\lambda)+A2 \cdot R2(\lambda)+A3 \cdot R3(\lambda) \ldots Ai \cdot Ri(\lambda)$$

which can be more generally expressed as in matrix form as $$S(\lambda)=\Sigma Ai \cdot Ri(\lambda) \text{ or } S=R \cdot A$$

If there are M channels images acquired and N individual fluorophores, the columns of the M×N matrix R is the known reference spectral signature of the individual fluorophores and the N×1 vector A is the unknown of the proportions of individual fluorophores and the M×1 vector S is the measured multichannel spectral vector at a pixel. In these equations, the signal in each pixel (S) is measured during acquisition of the multiplex image and the reference spectra for the known stains are usually determined in an independent offline method from fluorescent specimens labeled with only a single stain using identical instrument settings. The contributions of various stains (Ai) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma j \{S(\lambda j)-\Sigma i \, Ai \cdot Ri(\lambda j)\}2]/\partial Ai=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems and determining high-quality sets of reference vectors for the training assays.

In other embodiments, unmixing is accomplished using the methods described in WO2015/124772, entitled "Group Sparsity Model for Image Unmixing," filed on Feb. 23, 2015, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group including stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

In addition to the linear unmixing method described above, an alternative approach for the spectral unmixing of microscopic data may be utilized, especially for datasets consisting of only few spectral channels, where the approach is based on a correlation of intensity values of a pixel in different image channels (as can be visualized in scatterplots similar to the ones used in cytofluorimetry). The unmixing is then achieved by finding the distribution angles of the desired fluorophores in the scatterplot and by orthogonalizing them into separate channels ("stretching" them onto different axes of the plot). The method in principle does not require a priori information regarding the spectra because the main distributions can be found by line fitting. (See Zimmermann, supra).

Microscope/Imaging Systems/Contrast Agents (Stains)

Generally, and as noted herein, a microscope or imaging system 601 includes an illumination source configured to illuminate a target sample, optics configured to produce a magnified image of the illuminated target sample, and a detector, such as a digital camera, configured to capture a digital image of the magnified image. Quantitative results can be obtained through manipulation of the captured digital images (e.g. with an image processing module 606). Such image manipulation can include image processing techniques known to those skilled in the art. In at least some embodiments, one or more of such image capture and image manipulation is accomplished with the aid of one or more processors 608. The one or more processors 608 can include a computer 609 implementing pre-programmed instructions stored in a non-transitory computer readable memory 602.

The systems and processes described herein are general applicable to any microscopy system incorporating an illumination source. Examples of at least some microscope systems in which the systems and processes can be used included optical microscopy, fluorescent microscopy, and confocal laser scanning microscopy. An example of a microscopy system is the PM-2000 instrument commercially available from HistoRx, Inc., of New Haven, Conn. The systems and processes are particularly useful for systems geared towards providing a semi-quantitative or quantitative result. Exemplary applications include the use of immunohistochemistry (IHC) as used within the field of pathology (See, for example, Immunohistochemistry and Quantitative Analysis of Protein Expression, by M. Cregger et al., Arch. Pathol. Lab. Med., Vol. 130, July 2006 at pgs. 1026-1030). Typically, these results are based on the intensity of staining of a sample examined using the microscopy system.

Images are acquired from a slide having a tissue specimen disposed thereon, wherein the tissue specimen has been stained, and the tissue specimen thus comprises one or more detectable stains or contrast agents. A stain or contrast agent is a molecule or material that can produce a detectable (such as visually, electronically or otherwise) signal that indicates the presence and/or concentration of a label in a sample (the label indicating the approximate position of a target or biomarker). In some embodiments, the stain or contrast agent being detected comprises one or more quantum dots, fluorophores, enzyme-deposited fluorophores or chromogenic stains, or any combination thereof.

A wide variety of fluorophores and chromogenic contrast agents or stains are available. In general, the most frequently used fluorophores belong to several common chemical classes including coumarins, fluoresceins, rhodamines, and cyanines. Silver stains and fast red stains are examples of enzymatically deposited chromogenic or light absorbing stains that may be used by the skilled artisan. Methods for labeling and guidance in the choice of labels appropriate for various purposes are discussed, for example, in Sambrook et al., Molecular Cloning: A Laboratory Manual, Cold Spring Harbor Laboratory Press (1989) and Ausubel et al., Current Protocols in Molecular Biology, Greene Publishing Associates and Wiley-Intersciences (1987), the disclosures of which are incorporated herein by reference. Of course, the skilled artisan will be able to adapt the methods employed herein to accommodate these and other agents such that stain quality and/or uniformity assessments may be made.

In immuno-fluorescence, a fluorescent product is deposited at the site of an antigen, allowing for visual localization of the antigen in the sample. After photographic capture, the reaction product may be quantified by image-analysis software (e.g. with the image processing module 606). Furthermore, the antigen may be located in a specific cellular (e.g., nuclear, organellular, cytoplasmic, membranous) or extracellular location (See, for example Camp et al, Nature Medicine 8(11) 1323-1327, 2002)

In some embodiments, for fluorescent IHC, multiple digital images are obtained from the same target tissue sample stained with protein biomarker-specific antibodies and secondary fluorescent detection reagents (also referred to as dyes, stains, or contrast agents herein). Without wishing to be bound by any particular theory, it is believed that, when optimized, the fluorescent stains provide a broader dynamic range than available by absorbance-based chromogenic stains. Each of the digital images can be obtained using a different optical filter configured to pass a respective one of the secondary fluorescent signals. Thus, at least one respective digital image is obtained for each of the secondary fluorescent signals. In some embodiments, and for quantitative analysis, the captured digital images are manipulated (e.g., using image processing software) to obtain a respective score of the tissue sample.

While the techniques described herein were originally developed for use with fluorescence, the generalized calibration procedure is also applicable to multispectral capture of slides stained with light-absorbing chromogens. Chromogens include Hematoxylin and Eosin. Chromogenic stains also include, for example, Fast Red, 3,3'-Diaminobenzidine (DAB), and tyramide-based chromogenic substances (such as disclosed in U.S. application publication No. 2012/0171668, the disclosure of which us hereby incorporated by reference herein in its entirety) and quinone methide chromogenic substances (such as disclosed in U.S. application publication No. 2017/0089911, the disclosure of which is hereby incorporated by reference herein in its entirety). Further chromogenic components suitable for use include those described in PCT Publication No. WO/2018/002015, the disclosure of which is hereby incorporated by reference herein in its entirety. In some embodiments, the tissue sample is stained with a primary stain (e.g. hematoxylin). In some embodiments, the tissue sample is also stained with a secondary stain (e.g. eosin). In some embodiments, the tissue sample is stained in an IHC assay for a particular biomarker. Of course, the skilled artisan will appreciate that any biological sample may also be stained with one or more fluorophores.

The instrumentation configuration for bright field image capture would involve different band-passes for the illumination for both brightfield and fluorescence. The instrument configuration for multispectral capture would also involve different band-passes for the detection as well in the case of fluorescence. The term used to describe a particular band-pass used to capture data is "channel."

Methods of Acquiring Images Using Calibration Data

Figure 10:
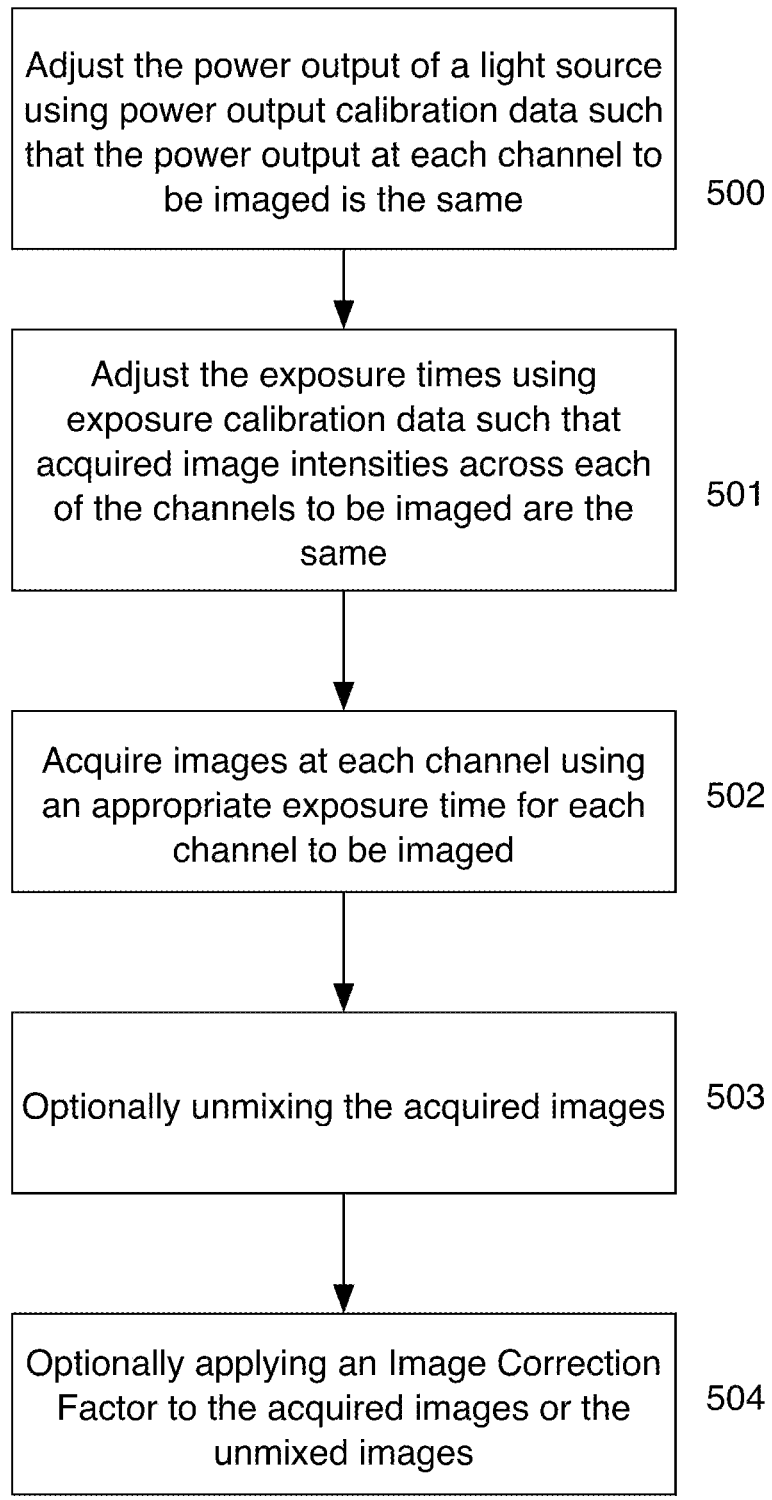
FIG. 10 illustrates an embodiment of the steps of acquiring images using calibration data.

In another aspect of the present disclosure, a method is provided for acquiring images of a tissue sample stained with one or more contrast agents, whereby the method utilizes calibration data such that variability in qualitative and/or quantitative results is reduced. In general, and with reference to FIG. 10, the method comprises (i) using power output calibration data to set a power output of a light source for each channel to be imaged (step 500); (ii) using exposure calibration data to set an appropriate exposure time for each channel to be imaged, such that the image intensities across each channel are the same (501); (iii) acquiring image data for each channel to be imaged (502); (iv) optionally unmixing the acquired images (step 503); and (v) optionally applying an Image Correction Factor to the acquired images or unmixed images (step 504). In some embodiments, the power output calibration data and/or the exposure calibration data is stored in a non-transitory computer readable memory (602). In some embodiments, and based on the procedures described herein, an imaging system 10 may be automatically set to a standardized equal illumination output power for every channel to be imaged based on power output calibration data stored in memory 602. Likewise, and again based on the procedures described herein, the exposure times of a camera within the imaging system may be automatically adjusted based on image intensity calibration data stored within memory 602 such that images having similar intensities may be acquired. In addition, the pixels within any acquired image (or unmixed image) may be adjusted based on Image Correction Factors for each stain, the Image Correction Factors stored within memory 602 and applied automatically after image acquisition and/or image unmixing.

In some embodiments, a method is provided for imaging a biological sample stained with one or more stains, each stain selectively identifying a particular target or biomarker within the biological sample, the method including: setting a power output of a light source for each channel to be imaged such that a predetermined power value is reached, wherein the predetermined power value is substantially the same for each channel to be imaged, and wherein the power output is independently set for each channel to be imaged; adjusting an exposure time of a camera to yield a target intensity at the predetermined power value, wherein the exposure time of each channel to be imaged is independently adjusted to yield the target intensity for that particular channel; acquiring a series of images of the biological sample at each channel to be image based on the adjusted exposure times; and adjusting pixel data in each of the acquired images based on derived image correction factors specific to each of the one or more stains. In some embodiments, the power output level for the light source is derived from preexisting calibration data for each of the channels to be imaged. In some embodiments, the preexisting calibration data is a calibration curve of power output versus measured power. In some embodiments, the preexisting calibration data is a table setting forth power outputs versus measured power (or interpolated power values), the power measured at the sample plane. In some embodiments, the predetermined power value is specific to a particular assay. For example, the predetermined power value may range from about 20 mW to about 500 mW. In some embodiments, the predetermined power value is substantially the same for all channels to be imaged. By "substantially the same" it is meant that the power values for each channel are within 10% of each other. In other embodiments, by "substantially the same" it is meant that power values for each channel are within 5% of each other. In other embodiments, by "substantially the same" it is meant that power values for each channel are within 2% of each other. In some embodiments, the power output values are computed using the power output calibration module 603 as described herein In some embodiments, the target intensity for a particular channel is a predetermined percentage of a standardized target intensity of a calibration sample for that channel. For example, the predetermined percentage may range from about 10% to about 1000% of the standardized target intensity. In other embodiments, the predetermined percentage may range from about 20% to about 500% of the standardized target intensity. In other embodiments, the predetermined percentage may range from about 50% to about 250% of the standardized target intensity.

In some embodiments, the standardized target intensity for each channel is derived by (i) determining calibration intensity values of the calibration standard for a plurality of image channels; (ii) normalizing the calibration intensity values of the calibration standard for each of the plurality of image channels to the highest intensity value; (iii) deriving a ratio of normalized intensity across the series of image channels; (iv) assigning a target intensity value for the brightest image channel in the series of image channels; and (v) calculating the standard intensity value for the remaining image channels. In some embodiments, the standard target intensity values are computed using the image intensity calibration module 604 as described herein.

In some embodiments, the derived image correction factors are computed by (i) normalizing brightness values for a plurality of stains; and (ii) subtracting the normalized brightness value for each stain from the integer 1. In some embodiments, the pixel data within each acquired image is adjusted by multiplying each pixel value within each acquired image by the respective image correction factor. In some embodiments, the image correction factors are derived using the contrast agent intensity correction module 605. In some embodiments, the method further comprises unmixing the acquired image prior to adjusting pixel data. In some embodiments, the acquired images are unmixed using the unmixing module 607.

In some embodiments, is a method of imaging a biological sample stained with one or more stains, each stain selectively staining a particular biomarker, including: setting a first power output of a light source for a first channel such that a predetermined power value is reached; adjusting a first exposure time of a camera to yield a first target intensity at the predetermined power value for the first channel; acquiring a first image of the biological sample at a first channel based on the adjusted exposure time; and adjusting pixel data in the first acquired image based on a first derived image correction factor specific to one of the one or more stains within the first channel. In some embodiments, the power output level for the light source is derived from preexisting calibration data for the first channel. In some embodiments, the preexisting calibration data is a calibration curve of power output versus measured power. In some embodiments, the predetermined power value is specific to a particular assay or protocol (e.g. an assay or protocol calling for a 100 mW power value). In some embodiments, the predetermined power value is the same for all channels to be imaged (e.g. 100 mW for the first channel, 100 mW for the second channel, 100 mW for the third channel, etc.). In some embodiments, the first target intensity is a predetermined percentage of a standardized target intensity of a calibration sample. In some embodiments, the predetermined percentage ranges from about 20% to about 150% of the standardized target intensity. In some embodiments, the predetermined percentage ranges from about 50% to about 150% of the standardized target intensity. In some embodiments, the standardized target intensity for the first channel is derived by (i) determining intensity values of the calibration standard for a plurality of image channels; (ii) normalizing the intensity values of the calibration standard for each of the plurality of image channels to the highest intensity value; (iii) deriving a ratio of normalized intensity across the series of image channels; (iv) assigning a target intensity value for the brightest image channel in the series of image channels; and (v) calculating the standard intensity value for the remaining image channels. In some embodiments, the first derived image correction factor is computed by (i) normalizing brightness values for a plurality of stains; and (ii) subtracting the normalized brightness value for the first stain from the integer 1. In some embodiments, the pixel data within the first image is adjusted by multiplying each pixel value within the first image by the first image correction factor.

In some embodiments, the method further comprises setting a second power output of a light source for a second channel such that a predetermined power value is reached; adjusting a second exposure time of a camera to yield a second target intensity at the predetermined power value for the second channel; acquiring a second image of the biological sample at a second channel based on the adjusted exposure time; and adjusting pixel data in the second acquired image based on a first derived image correction factor specific to one of the one or more stains within the second channel. Of course, the skilled artisan will appreciate that the above-identified method may be repeated any number of times for each biological stain.

Other Components for Practicing Embodiments of the Present Disclosure

The computer system of the present disclosure may be tied to a specimen processing apparatus that can perform one or more preparation processes on the biological specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes (e.g. probes containing a specific binding entity which facilitates the labeling of targets within the sample), reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a bright-field imager slide scanner. One bright-field imager is the iScan HT and DP200 bright-field scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Publication No. 2014/0178169 filed on Sep. 9, 2011, entitled IMAGING SYSTEMS, CASSETTES, AND METHODS OF USING THE SAME.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a biological sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the biological sample as the spectrally selective system is being adjusted or tuned (for example with a computer processor) such as to assure that images are acquired in different discrete spectral bands. The apparatus may additionally contain a display in which appears at least one visually perceivable image of the biological specimen from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Additional Embodiments

Additional Embodiment 1. A method of imaging a biological sample stained with one or more stains, each stain identifying a particular target within the biological sample, comprising:
  setting a first power output of a light source for a first channel such that a first predetermined power value is reached;
  adjusting a first exposure time of a camera to yield a first target intensity at the first predetermined power value for the first channel;
  acquiring a first image of the biological sample in a first channel based on the adjusted first exposure time; and
  adjusting pixel data in the first acquired image based on a first derived image correction factor specific to one of the one or more stains within the first channel.

Additional Embodiment 2. The method of additional embodiment 1, wherein the first power output level for the light source is derived from preexisting calibration data for the first channel.

Additional Embodiment 3. The method of additional embodiment 2, wherein the preexisting calibration data is a calibration curve of power output versus measured power.

Additional Embodiment 4. The method of any of the preceding additional embodiments, wherein the first predetermined power value is specific to a particular assay.

Additional Embodiment 5. The method of additional embodiment 4, wherein the first predetermined power value is the same for all channels.

Additional Embodiment 6. The method of any of the preceding additional embodiments, wherein the first target intensity is a predetermined percentage of a standardized target intensity of a calibration sample for the first channel.

Additional Embodiment 7. The method of additional embodiment 6, wherein the predetermined percentage ranges from about 20% to about 500% of the standardized target intensity for the first channel.

Additional Embodiment 8. The method of additional embodiment 6, wherein the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

Additional Embodiment 9. The method of any of the preceding additional embodiments, wherein the first derived image correction factor is computed by (i) normalizing brightness values for a plurality of stains; and (ii) subtracting the normalized brightness value for the first stain from the integer 1.

Additional Embodiment 10. The method of any of the preceding additional embodiments, wherein the pixel data within the first image is adjusted by multiplying each pixel value within the first image by the first image correction factor.

Additional Embodiment 11. The method of any of the preceding additional embodiments, further comprising unmixing the first acquired image prior to adjusting the pixel data.

Additional Embodiment 12. A method of imaging a biological sample stained with one or more stains, each stain identifying a particular biomarker within the biological sample, comprising:
  setting a power output of a light source for each of a plurality of image channels such that a predetermined power value is reached, wherein the predetermined power value is substantially the same for each channels, and wherein the power output is independently set for each of the plurality of image channels;
  adjusting an exposure time of a camera to yield a target intensity at the predetermined power value, wherein the exposure time of each of the plurality of image channels is independently adjusted to yield the target intensity for that particular image channel;
  acquiring a series of images of the biological sample at each of the plurality of image channels based on the adjusted exposure times; and
  adjusting pixel data in each image of the series of acquired images based on derived image correction factors specific to each of the one or more stains.

Additional Embodiment 13. The method of additional embodiment 12, wherein the power output level for the light source is derived from preexisting calibration data for each of the plurality of image channels.

Additional Embodiment 14. The method of additional embodiment 13, wherein the preexisting calibration data is a calibration curve of power output versus measured power.

Additional Embodiment 15. The method of any of additional embodiments 12 to 14, wherein the predetermined power value is specific to a particular assay.

Additional Embodiment 16. The method of additional embodiment 15, wherein the predetermined power value is the same for each of the image channels of the plurality of image channels.

Additional Embodiment 17. The method of any of additional embodiments 12 to 16, wherein the target intensity for a particular channel is a predetermined percentage of a standardized target intensity of a calibration sample for that channel.

Additional Embodiment 18. The method of additional embodiment 17, wherein the predetermined percentage ranges from about 20% to about 500% of the standardized target intensity for that channel.

Additional Embodiment 19. The method of additional embodiment 17, wherein the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

Additional Embodiment 20. The method of any of additional embodiments 12 to 19, wherein the derived image correction factors are computed by (i) normalizing brightness values for a plurality of stains; and (ii) subtracting the normalized brightness value for each stain from the integer 1.

Additional Embodiment 21. The method of any of additional embodiments 12 to 20, wherein the pixel data within each acquired image is adjusted by multiplying each pixel value within each acquired image by the respective image correction factor.

Additional Embodiment 22. The method of any of additional embodiments 12 to 21, further comprising unmixing the acquired image prior to adjusting pixel data.

Additional Embodiment 23. A method of imaging a biological sample stained with one or more stains, each stain selectively staining a particular biomarker within the biological sample, comprising:
  deriving a power value for each image channel of a plurality of image channels, wherein each power value for each image channel image is substantially the same, the power values derived by adjusting a power output of a light source for each image channel of the plurality of image channels based power output calibration data for each of the image channels;
  adjusting exposure times for each image channel of the plurality of image channels using image intensity calibration data such that image intensities across each image channel of the plurality of image channels are substantially the same;
  acquiring a plurality of images of the biological sample at each image channel based on the adjusted exposure times to provide a series of acquired channel images;
  unmixing each of the acquired images to provide a series of unmixed image channel images; and
  adjusting pixel data in each unmixed image channel image based on derived image correction factors specific to each of the one or more stains.

Additional Embodiment 24. The method of additional embodiment 23, wherein the power output calibration data is a table of look-up values of power output for a light source versus power values measured at the sample plane.

Additional Embodiment 25. The method of any of additional embodiments 23 to 24, wherein the image intensity calibration data is selected from the group consisting of (i) ratios of target intensities for each channel of the plurality of image channels, and (ii) ratios of exposure times for each channel of the plurality of image channels relative to a longest exposure time to be imaged.

Additional Embodiment 26. The method of any of additional embodiments 23 to 25, wherein the derived image correction factors are computed by (i) normalizing brightness values for a plurality of stains; and (ii) subtracting the normalized brightness value for each stain from the integer 1.

Additional Embodiment 27. The method of any of additional embodiments 23 to 26, further comprising quantifying an amount of the one or more stains within the biological sample based on the adjusted pixel data in each unmixed channel image.

Additional Embodiment 28. A non-transitory computer-readable medium storing computer executable instructions which, when executed by one or more processors, cause the one or more processors to:
  set a power output of a light source for each of a plurality of image channels using pre-existing power output calibration data for each channel such that a predetermined power value for each channel is reached, where the predetermined power value is the same for each channel and where the predetermined power value is specific to a particular assay;
  adjust exposure times for each channel using pre-existing image intensity calibration data such that image intensities across each of a plurality of image channels are substantially the same;
  acquire images of a biological sample at each image channel based on the adjusted exposure times to provide a series of acquired image channel images, wherein the biological sample is stained with one or more stains, each stain selectively identifying a particular target within the biological sample; and
  adjusting pixel data in each individual acquired image channel image based on derived image correction factors specific to each of the one or more stains.

Additional Embodiment 29. The non-transitory computer-usable medium of additional embodiment 28, wherein the power output calibration data is a table of power output values correlated with power values measured at the sample plane.

Additional Embodiment 30. The non-transitory computer-usable medium of additional embodiment 29, wherein the image intensity calibration data are ratios of target intensities for each channel to be imaged.

Additional Embodiment 31. The non-transitory computer-usable medium of additional embodiment 30, wherein the ratios of target intensities for each channel to be image are derived by (i) determining intensity values of the calibration standard for a plurality of image channels; (ii) normalizing the intensity values of the calibration standard for each of the plurality of image channels to a highest intensity value; and (iii) deriving a ratio of normalized intensity across the series of image channels.

Additional Embodiment 32. The non-transitory computer-usable medium of any of additional embodiments 28 to 31, wherein the derived image correction factors are computed by (i) normalizing brightness values for a plurality of stains; and (ii) subtracting the normalized brightness value for each stain from the integer 1.

Additional Embodiment 33. The non-transitory computer-usable medium of any of additional embodiments 28 to 32, further comprising instructions which cause the processor to unmix the series of acquired channel images prior to adjusting pixel data.

Additional Embodiment 34. The non-transitory computer-usable medium of any of additional embodiments 28 to 33, wherein the stains are fluorophores.

Additional Embodiment 35. An imaging system comprising: an illumination source, one or more lenses, a camera, at least one of a control system or computer, and the non-transitory computer-usable medium of any of additional embodiments 28-34.

Additional Embodiment 36. The imaging system of additional embodiment 35, further comprising a slide handling mechanism.

Additional Embodiment 37. The imaging system of additional embodiment 36, wherein the slide handling mechanism is adapted to deliver a slide to a specimen plane.

Additional Embodiment 38. The imaging system of additional embodiment 36, wherein the slide handling mechanism is adapted to deliver one of a power meter or a calibration sample to a specimen plane.

Additional Embodiment 39. The imaging system of additional embodiment 38, further comprising a non-transitory computer-usable medium storing computer executable instructions which, when executed by the one or more processors, cause the one or more processors to generate new or revised power output calibration data or image intensity calibration data.

Additional Embodiment 40. A digital pathology system comprising: an imaging apparatus and at least one of a control system or computer, and the non-transitory computer-usable medium of any of additional embodiments 28-34.

Additional Embodiment 41. The digital pathology system of additional embodiment 40, wherein the imaging apparatus is a multi-spectral imaging apparatus.

Additional Embodiment 42. A system comprising one or more processors and a memory coupled to the one or more processors, the memory to store computer-executable instructions that, when executed by the one or more processors, cause the one or more processors to perform operations comprising: setting a first power output of a light source for a first channel such that a predetermined power value is reached; adjusting a first exposure time of a camera to yield a first target intensity at the predetermined power value for the first channel; acquiring a first image of a biological sample at a first channel based on the adjusted exposure time, wherein the biological sample is stained with one or more stains, each stain selectively identifying a particular target within the biological sample; and adjusting pixel data in the first acquired image based on a first derived image correction factor specific to one of the one or more stains within the first channel.

Additional Embodiment 43. The system of additional embodiment 42, wherein the first power output level for the light source is derived from preexisting calibration data for the first channel.

Additional Embodiment 44. The system of additional embodiment 43, wherein the preexisting calibration data is a calibration curve of power output versus measured power.

Additional Embodiment 45. The system of any of additional embodiments 42 to 44, wherein the first predetermined power value is specific to a particular assay.

Additional Embodiment 46. The system of any of additional embodiments 42 to 45, wherein the first predetermined power value is the same for all channels.

Additional Embodiment 47. The system of any of additional embodiments 42 to 46, wherein the first target intensity is a predetermined percentage of a standardized target intensity of a calibration sample for the first channel.

Additional Embodiment 48. The system of additional embodiment 47, wherein the predetermined percentage ranges from about 20% to about 500% of the standardized target intensity for the first channel.

Additional Embodiment 49. The system of additional embodiment 48, wherein the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

Additional Embodiment 50. The system of any of additional embodiments 42 to 49, wherein the first derived image correction factor is computed by (i) normalizing brightness values for a plurality of stains; and (ii) subtracting the normalized brightness value for the first stain from the integer 1.

Additional Embodiment 51. The system of any of additional embodiments 42 to 50, wherein the pixel data within the first image is adjusted by multiplying each pixel value within the first image by the first image correction factor.

Additional Embodiment 52. The system of any of additional embodiments 42 to 51, further comprising instructions for unmixing the first acquired image prior to adjusting the pixel data.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method of imaging a biological sample stained with one or more stains, each stain identifying a particular target within the biological sample, comprising:
setting a first power output of a light source for a first channel such that a first predetermined power value is reached;
adjusting a first exposure time of a camera to yield a first target intensity at the first predetermined power value for the first channel;
acquiring a first image of the biological sample in a first channel based on the adjusted first exposure time; and
adjusting pixel data in the first acquired image based on a first derived image correction factor specific to one of the one or more stains within the first channel, wherein the first derived image correction factor is computed by (i) normalizing brightness values for a plurality of stains; and (ii) subtracting the normalized brightness value for the first stain from the integer 1.

2. The method of claim 1, wherein the first power output level for the light source is derived from preexisting calibration data for the first channel.

3. The method of claim 2, wherein the preexisting calibration data is a calibration curve of power output versus measured power.

4. The method of claim 1, wherein the first predetermined power value is specific to a particular assay.

5. The method of claim 4, wherein the first predetermined power value is the same for all channels.

6. The method of claim 1, wherein the first target intensity is a predetermined percentage of a standardized target intensity of a calibration sample for the first channel.

7. The method of claim 6, wherein the predetermined percentage ranges from about 20% to about 500% of the standardized target intensity for the first channel.

8. The method of claim 6, wherein the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

9. The method of claim 1, wherein the pixel data within the first image is adjusted by multiplying each pixel value within the first image by the first image correction factor.

10. A system comprising one or more processors and a memory coupled to the one or more processors, the memory to store computer-executable instructions that, when executed by the one or more processors, cause the one or more processors to perform operations comprising:
setting a first power output of a light source for a first channel such that a first predetermined power value is reached;
adjusting a first exposure time of a camera to yield a first target intensity at the first predetermined power value for the first channel;
acquiring a first image of the biological sample in a first channel based on the adjusted first exposure time; and
adjusting pixel data in the first acquired image based on a first derived image correction factor specific to one of the one or more stains within the first channel, wherein the first derived image correction factor is computed by (i) normalizing brightness values for a plurality of stains; and (ii) subtracting the normalized brightness value for the first stain from the integer 1.

11. The system of claim 10, wherein the first power output level for the light source is derived from preexisting calibration data for the first channel.

12. The system of claim 11, wherein the preexisting calibration data is a calibration curve of power output versus measured power.

13. The system of claim 10 wherein the first predetermined power value is specific to a particular assay.

14. The system of claim 13, wherein the first predetermined power value is the same for all channels.

15. The system of claim 10, wherein the first target intensity is a predetermined percentage of a standardized target intensity of a calibration sample for the first channel.

16. The system of claim 15, wherein the standardized target intensity for the first channel is derived by (i) determining calibration intensity values of the calibration standard for each of a plurality of image channels; (ii) normalizing the calibration intensity values of the calibration standard for each of the plurality of image channels to a highest intensity value of each of the normalized calibration intensity values; (iii) deriving a ratio of normalized intensity across the plurality of image channels; (iv) assigning a target intensity value for the brightest image channel in the plurality of image channels; and (v) calculating the standard intensity value for the remaining image channels.

17. The system of claim 10, wherein the pixel data within the first image is adjusted by multiplying each pixel value within the first image by the first image correction factor.

18. A system comprising one or more processors and a memory coupled to the one or more processors, the memory to store computer-executable instructions that, when executed by the one or more processors, cause the one or more processors to perform operations comprising: setting a first power output of a light source for a first channel such that a predetermined power value is reached; adjusting a first exposure time of a camera to yield a first target intensity at the predetermined power value for the first channel; acquiring a first image of a biological sample at a first channel based on the adjusted exposure time, wherein the biological sample is stained with one or more stains, each stain selectively identifying a particular target within the biological sample; and adjusting pixel data in the first acquired image based on a first derived image correction factor specific to one of the one or more stains within the first channel, wherein the first power output level for the light source is derived from preexisting calibration data for the first channel, wherein the preexisting calibration data for the first channel is a calibration curve of power output versus measured power.

19. The system of claim 18, wherein the pixel data within the first image is adjusted by multiplying each pixel value within the first image by the first image correction factor.

20. The system of claim 18, wherein the first target intensity is a predetermined percentage of a standardized target intensity of a calibration sample for the first channel.

* * * * *